US007911635B2

(12) United States Patent
Kimura

(10) Patent No.: US 7,911,635 B2
(45) Date of Patent: Mar. 22, 2011

(54) METHOD AND APPARATUS FOR AUTOMATED DOWNLOAD AND PRINTING OF WEB PAGES

(75) Inventor: Hiroyuki Kimura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1181 days.

(21) Appl. No.: 11/227,880

(22) Filed: Sep. 15, 2005

(65) Prior Publication Data

US 2006/0056873 A1 Mar. 16, 2006

(30) Foreign Application Priority Data

Sep. 15, 2004 (JP) ................................ 2004-268709

(51) Int. Cl.
*G06F 3/12* (2006.01)

(52) U.S. Cl. ...... 358/1.15; 358/1.12; 707/737; 709/201; 709/203; 709/219; 715/234; 715/745; 715/748

(58) Field of Classification Search ................. 358/1.15; 707/1, 10; 709/217
See application file for complete search history.

(56) References Cited

U.S. PATENT DOCUMENTS

| | | | | |
|---|---|---|---|---|
| 5,715,379 | A * | 2/1998 | Pavlovic et al. | 358/1.13 |
| 6,211,874 | B1 * | 4/2001 | Himmel et al. | 715/781 |
| 6,313,855 | B1 * | 11/2001 | Shuping et al. | 715/854 |
| 6,460,060 | B1 * | 10/2002 | Maddalozzo et al. | 715/234 |
| 6,738,841 | B1 * | 5/2004 | Wolff | 710/62 |
| 6,856,415 | B1 * | 2/2005 | Simchik et al. | 358/1.15 |
| 7,085,801 | B1 * | 8/2006 | Abdelhadi et al. | 709/201 |
| 2002/0093676 | A1 * | 7/2002 | Parry | 358/1.15 |
| 2003/0167275 | A1 * | 9/2003 | Rjaibi | 707/101 |
| 2003/0187668 | A1 * | 10/2003 | Ullmann et al. | 705/1 |
| 2004/0044767 | A1 * | 3/2004 | Rivers et al. | 709/225 |
| 2004/0066531 | A1 * | 4/2004 | Kim | 358/1.15 |
| 2004/0128280 | A1 * | 7/2004 | Gomi et al. | 707/1 |
| 2006/0119888 | A1 | 6/2006 | Shima | |

FOREIGN PATENT DOCUMENTS

| | | | |
|---|---|---|---|
| JP | 11-025156 | A | 1/1999 |
| JP | 11-237968 | | 8/1999 |
| JP | 2000-148573 | A | 5/2000 |
| JP | 2001-331283 | A | 11/2001 |

OTHER PUBLICATIONS

Snell ("Sams Teach Yourself the Internet in 24 Hours, Third Edition", Sams, 1999, ISBN-13: 978-0-672-31589-3), selected excerpts.*
Cameron et al. ("Learning GNU Emacs, 2nd Edition", O'Reilly Media, Inc., 1996, ISBN-13: 978-1-565-92152-8), selected excerpts.*
The above references were cited in a Nov. 28, 2008 Japanese Office Action that issued in Japanese Patent Application No 2004-268709, which is enclosed with partial English Translation.

* cited by examiner

*Primary Examiner* — King Y Poon
*Assistant Examiner* — David S Cammack
(74) *Attorney, Agent, or Firm* — Cowan, Liebowitz & Latman, P.C.

(57) ABSTRACT

This invention relates to an image forming apparatus which can prevent the user from repetitively pressing a print button or repeating a print instruction for respective pages, and can save output sheets as much as possible upon printing Web contents over a plurality of pages. An image forming apparatus according to this invention is capable of accessing a network and displaying a Web page. This apparatus includes: URL (Uniform Resource Locator) recording means for recording URL information of a plurality of browsed Web pages; page acquisition means for acquiring a plurality of Web page data corresponding to the URL information recorded by the URL recording means; page integration means for integrating the plurality of Web page data acquired by the page acquisition means; and print means for executing print processing on the basis of the plurality of integrated Web page data.

5 Claims, 24 Drawing Sheets

FIG. 7

| Page(n) | URL | |
|---|---|---|
| 1 | http : //AAAAA.co.jp/index2.html | ← SECOND PAGE OF WEB PAGE |
| 2 | http : //AAAAA.co.jp/index1.html | ← FIRST PAGE OF WEB PAGE |
| 3 | http : //AAAAA.co.jp/index3.html | ← THIRD PAGE OF WEB PAGE |

```
[DESCRIPTION OF R1301]
char_color={0.0, 0.0, 0.0, 1.0} ;            ←L1311
string1="IC" ;                                ←L1312
put_char(0.0, 0.0, 0.3, 0.1, string1) ;       ←L1313

[DESCRIPTION OF R1302]
line_color={1.0, 0.0, 0.0, 0.0} ;            ←L1321
put_line(0.9, 0.0, 0.9, 1.0, 0.1) ;           ←L1322

[DESCRIPTION OF R1303]
image1={CMYK, 8, 5, 5, C0, M0, Y0, K0,        ←L1331
                  C1, M1, Y1, K1,
                        ⋮
                 C24, M24, Y24, K24} ;
put_image(0.0, 0.5, 0.5, 0.5, image1) ;       ←L1332
```

FIG. 22

UserID : kimura

| ORDER | CHARACTER STRING | HIT COUNT |
|---|---|---|
| 1 | TO NEXT | 23 |
| 2 | NEXT PAGE | 14 |
| 3 | Next | 13 |
| 4 | PREVIOUS PAGE | 5 |
| 5 | Previous | 2 |

FIG. 24

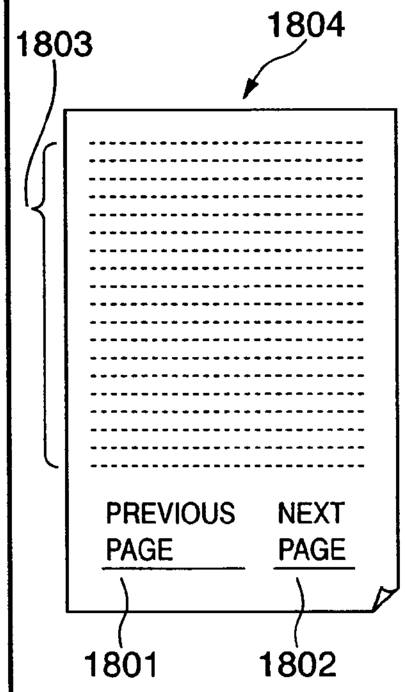

```
<html xmlns : o="urn : schemas-microsoft-
com : office : office"
xmlns : w="urn : schemas-microsoft-com : office : word"
xmlns="http : //www.w3.org/TR/REC-html40">

<head>
<meta http-equiv=Content-Type content="text/html ;
charset=shift_jis">
<meta name=ProgId content=Word.Document>
<link rel=File-List href="./Hello.files/filelist/xml">
<title>Hello</title>

</head>
<body lang=JA style=' tab-interval : 42.0pt ; text-
justify-trim : punctuation '>
<FORM>
<A HREF="previous.html">PREVIOUS PAGE</A>←18-a
<A HREF="next.html">NEXT PAGE</A>←18-b
</FORM>
</body>
</html>
```

METHOD AND APPARATUS FOR AUTOMATED DOWNLOAD AND PRINTING OF WEB PAGES

FIELD OF THE INVENTION

The present invention relates to an apparatus which can be connected to a network, and has a function of acquiring predetermined information in a designated device on the network, and browsing the information, and a print control method.

BACKGROUND OF THE INVENTION

In recent years, a multi-function printer to which many functions are added based on a digital copying machine is in practical use. More specifically, apparatuses such as a copy, facsimile, printer, scanner, and the like are integrated as one apparatus. In addition, a function of saving scanned image data in a hard disk or the like is added to that apparatus.

An operation panel used to operate these multiple functions becomes larger in size in recent years. Such operation panel can not only make operation settings of functions utilizing the scanner and printer, but also display for monitoring the operations and status of remote devices on the network and display Web contents (Web pages) using a browser function on its operation screen.

For example, Japanese Patent Application Laid-Open No. 11-237968 discloses a method which allows the network user to call a print selection mode to quickly identify Web pages so as to print them by a single and continuous batch processing, and can enqueue the identified Web pages, and a computer system that implements this method. Japanese Patent Application Laid-Open No. 11-237968 particularly relates to a print selection method which displays a plurality of choices and allows the user to select desired text for required print processing from them using a full-text target parameter or each individual parameter. In one example, the user can select any desired one from a list of available Hyperlinks on a target page for a subsequent print selection. The system prints according to print parameters selected by the user. For this purpose, the user quickly designates a list of selected pages and those at destinations of the Hyperlinks up to the designated level. The system saves the designation, and can start asynchronous print processing for all the selected pages at the same time.

However, according to the prior arts including Japanese Patent Application Laid-Open No. 11-237968, in order to print Web contents over a plurality of pages, the user must type in a desired URL, download Web contents information represented by HTML from a server at the destination of the URL, and display the Web contents on the screen. Then, the user determines whether or not they are to be printed and presses a print button, thus completing print processing. Therefore, the operation for displaying another page and pressing the print button must be repeated.

There are various display types of Web contents. For example, some Web contents are formed of a very long page in a format represented by HTML, or some other Web contents include a link such as "next page" to reduce the load of scrolling by the user, so that the next page is displayed by the user's clicking. In case of a long document, if the user wants to print upon browsing it, he or she need only press the "print" button once. By contrast, in a case where the Web contents consist of a plurality of pages, the user must alternately repeat page browsing and a print instruction, thus imposing a heavy operation load on the user.

SUMMARY OF THE INVENTION

Accordingly, the present invention is conceived as a response to the above-described disadvantages of the conventional art.

For example, an image forming apparatus and a print control method according to the present invention are capable of printing Web contents over a plurality of pages by a simple print instruction while minimizing user's operations.

Such an image forming apparatus is also capable of saving output sheets as much as possible upon printing Web contents over a plurality of pages.

According to one aspect of the present invention, preferably, there is provided an image forming apparatus capable of accessing a network and displaying a Web page, comprising: URL (Uniform Resource Locator) recording means for recording URL information of a plurality of browsed Web pages; page acquisition means for acquiring a plurality of Web page data corresponding to the URL information recorded by the URL recording means; page integration means for integrating the plurality of Web page data acquired by the page acquisition means; and print means for executing print processing on the basis of the plurality of integrated Web page data.

According to another aspect of the present invention, preferably, there is provided an image forming apparatus capable of accessing a network and displaying a Web page, comprising: URL (Uniform Resource Locator) recording means for recording a URL of a browsed Web page; character string recording means for recording character strings designated by a user in the browsed Web page in a form of a list; sorting means for sorting a list of the recorded character strings in an order of frequency of the designation; and search means for searching the browsed Web page for character strings in the order of frequency of the designation in the list; Web page acquisition means for acquiring Web page data corresponding to the URL information recorded in the URL recording means and Web page data which are linked with the character strings found by the search means; page integration means for integrating a plurality of Web page data acquired by the Web page acquisition means; and print means for executing print processing on the basis of the plurality of integrated Web page data.

According to still another aspect of the present invention, preferably, there is provided a Web page print control method using an apparatus capable of accessing a network and displaying a Web page, comprising: a page acquisition step of acquiring a plurality of Web page data corresponding to URLs (Uniform Resource Locators) of a plurality of browsed Web pages recorded in the apparatus; a page integration step of integrating the plurality of Web page data; and a print step of executing print processing on the basis of the plurality of integrated Web page data.

According to still another aspect of the present invention, preferably, there is provided a Web page print control method using an apparatus capable of accessing a network and displaying a Web page, comprising: a URL (Uniform Resource Locator) recording step of recording a URL of a browsed Web page in a URL table of the apparatus; a character string recording step of recording character strings designated by a user in the browsed Web page in a form of a list; a sorting step of sorting a list of the recorded character strings in an order of frequency of the designation; and a search step of searching the browsed Web page for character strings in the order of frequency of the designation in the list; a Web page acquisition step of acquiring Web page data corresponding to the URL information recorded in the URL recording step and Web page data which are linked with the character strings found in the search step; a page integration step of integrating a plurality of Web page data acquired in the Web page acquisition step; and a print step of executing print processing on the basis of the plurality of integrated Web page data.

Other features of the present invention will be apparent from the best mode for carrying out the invention and the accompanying drawings.

The invention is particularly advantageous since the user need not repetitively press a print button and issue a print instruction for respective pages even when Web contents over a plurality of pages are to be printed.

According to the image forming apparatus based on the present invention, output sheets can be saved as much as possible when a plurality of Web pages are to be printed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a conceptual view of a URL table;

FIG. 22 is a view showing an example of a character string table;

FIG. 24 is a view showing Hypertext in an HTML document.

DETAILED DESCRIPTION OF THE PREFERRED EMBODIMENTS

Preferred embodiments of the present invention will now be described in detail in accordance with the accompanying drawings.

The first to third embodiments as the best modes of carrying out the invention will be described hereinafter. These embodiments are merely specific examples for embodying the present invention, the present invention is not limited to these embodiments, and any other embodiments can be applies unless they have different principles.

Items common to respective embodiments will be explained first and those unique to each of the embodiments will then be explained with reference to the accompanying drawings.

Items Common to Respective Embodiments (1) Network Arrangement

Figure 1:
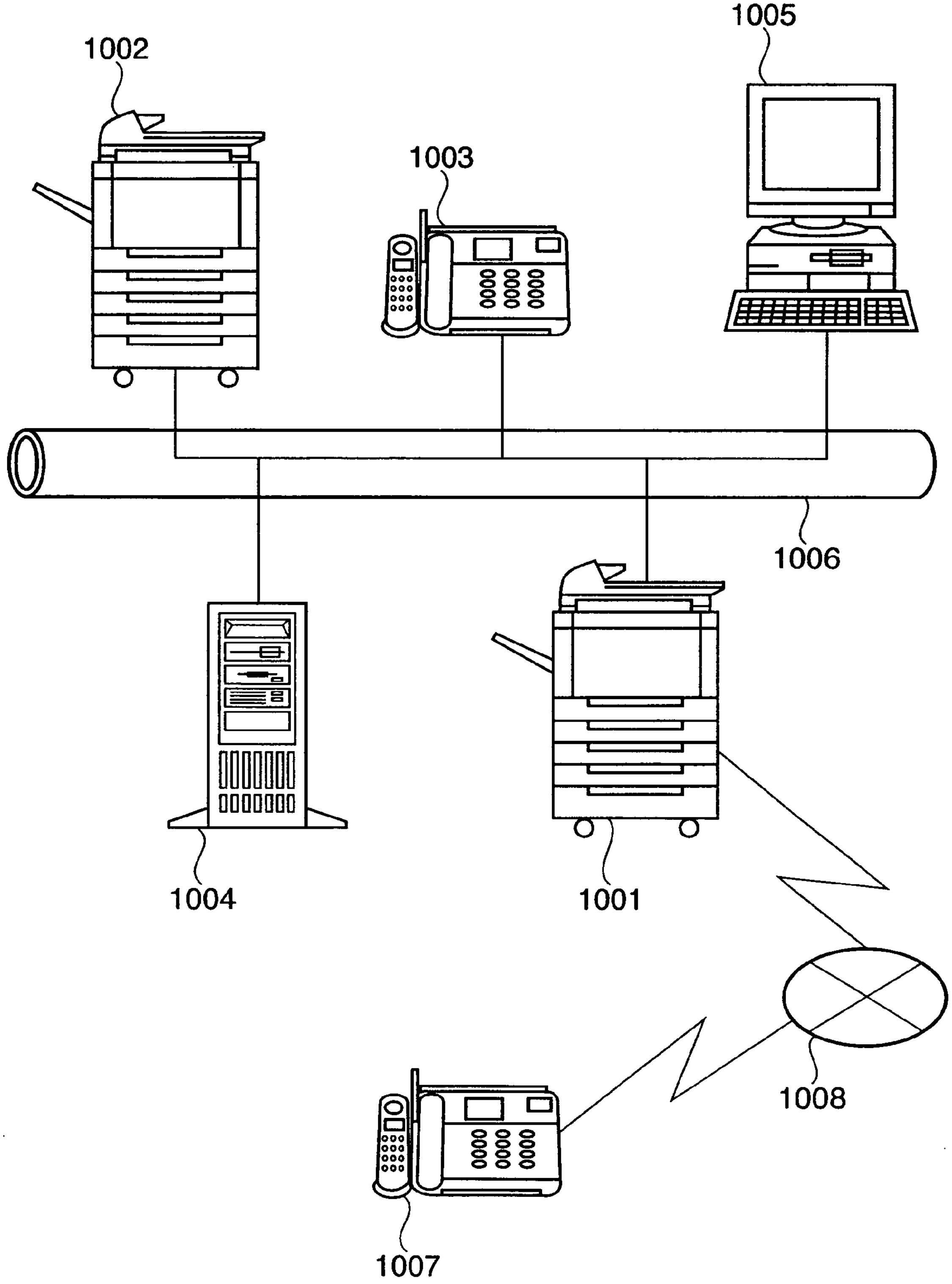
FIG. 1 is a diagram showing the network arrangement according to the present invention.

FIG. 1 is a diagram illustrating the arrangement of a network which accommodates a multi-function image forming apparatus common to each embodiment of the present invention. In this case, a copying machine having a data transmission/reception function is assumed as the multi-function image forming apparatus.

As shown in FIG. 1, a copying machine 1001 is connected to a LAN 1006 implemented by Ethernet® or the like together with a copying machine 1002 having functions equivalent to those of the copying machine 1001, a facsimile apparatus 1003, a database/mail server 1004, and a client computer 1005. Also, the copying machine 1001 is connected to a public communication line 1008 together with a facsimile apparatus 1007. The copying machine 1001 has copy and facsimile functions, and also a data transmission function of scanning a document image, and transmitting scanned image data to respective apparatuses on the LAN 1006. Also, since the copying machine 1001 has a PDL function, it can receive and print a PDL image designated by a computer connected on the LAN 1006.

The copying machine 1001 can save an image scanned by itself, and a PDL image designated by a computer connected on the LAN 1006 in a designated box area in a hard disk 2004, and can print an image saved in the box area.

The copying machine 1001 can receive data scanned by the copying machine 1002 via the LAN 1006, and can save the received data in its hard disk 2004 and/or print it out. Also, the copying machine 1001 can receive an image from the database/mail server 1004 via the client computer 1005 and LAN 1006, and can save the image in itself and/or can print it out.

The facsimile apparatus 1003 receives data scanned by the copying machine 1001 via the LAN 1006, and can transmit that received data. The database/mail server 1004 is a server apparatus which receives data scanned by the copying machine 1001 via the LAN 1006, stores it in a database, and transmits the data as an e-mail message.

The client computer 1005 is connected to the database/mail server 1004, and can display desired data acquired from the database/mail server 1004. Also, the client computer 1005 receives data scanned by the copying machine 1001 via the LAN 1006, and can modify and edit the received data. The database/mail server 1004 may have a function as an HTTP (Hyper Text Transfer Protocol) server. In this case, Web contents stored in the database/mail server 1004 can be displayed using a Web browser of the client computer 1005 and a Web browser function of the copying machines 1001 and 1002 (to be described later).

The facsimile apparatus 1007 can receive data scanned by the copying machine 1001 via the public communication line 1008, and can print out the received data.

Figure 2:
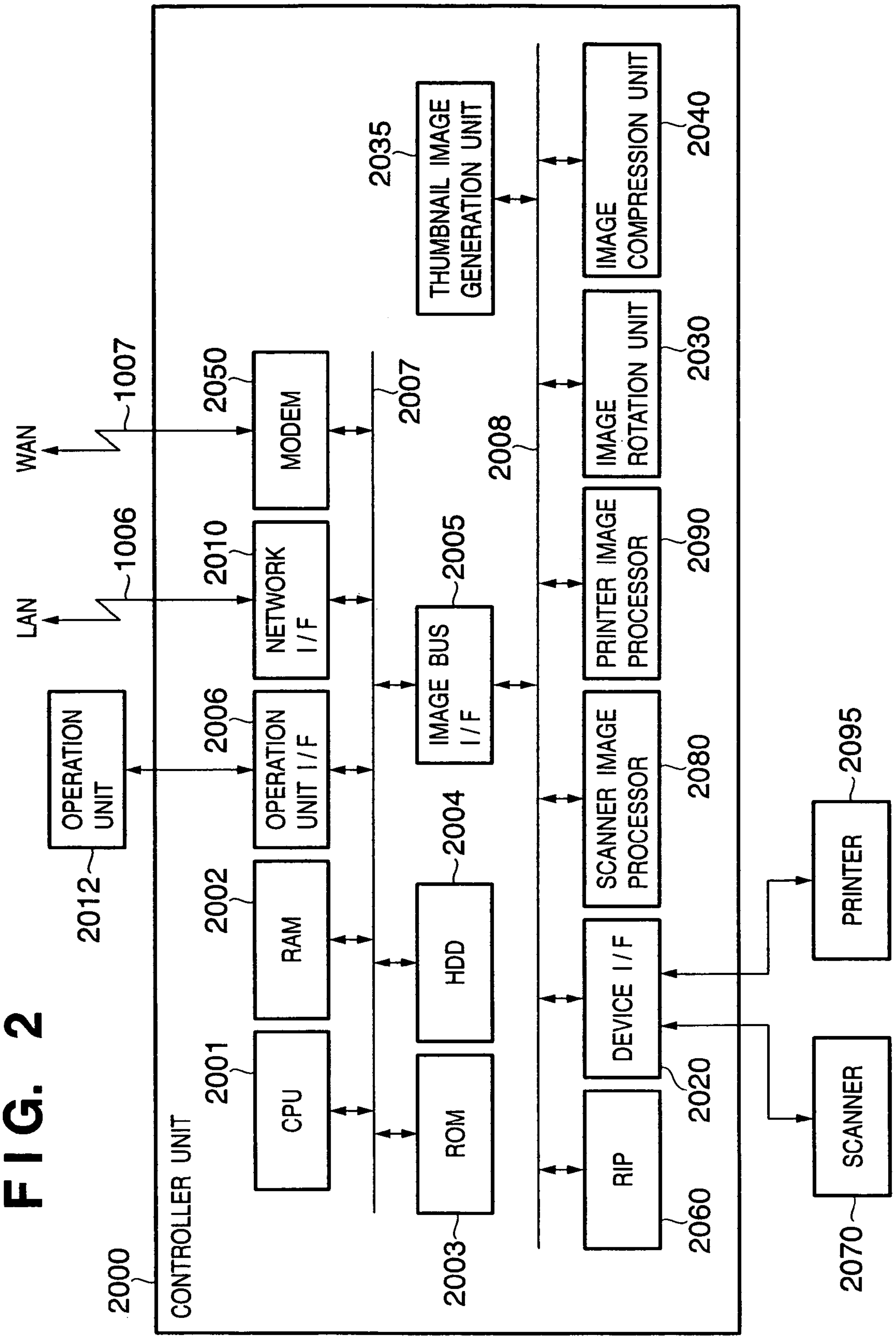
FIG. 2 is a block diagram showing the principal arrangement of an image forming apparatus.

(2) Principal Arrangement Block Diagram of Copying Machine 1001 as Image Forming Apparatus FIG. 2 is a block diagram showing the principal arrangement of the copying machine 1001 as an image forming apparatus which is commonly applied to respective embodiments.

A controller unit 2000 connects a scanner 2070 as an image input device and a printer 2095 as an image output device, and performs control for implementing a copy function of printing out image data scanned by the scanner 2070 via the printer 2095. Also, the controller unit 2000 connects the LAN 1006 and public communication line 1007 (WAN) and performs control for inputting/outputting image information and device information.

More specifically, the controller unit 2000 has a CPU 2001, which loads and activates an operating system (OS) by a boot program stored in a ROM 2003, and executes application programs stored in an HDD (hard disk drive) 2004 under the control of this OS, thus implementing various kinds of processing. A RAM 2002 is used as a work area of the CPU 2001.

The RAM 2002 includes both volatile and non-volatile types. A volatile RAM provides an image memory area for temporarily storing image data as well as functioning as a work area, and is used to temporarily hold a browsed URL table and selected character strings (to be described later). On the other hand, a non-volatile RAM stores information of the image forming apparatus and the like, which is to be held even after power OFF. For example, the non-volatile RAM stores image-related parameters, and keywords which are selected frequently in a Web page (to be described later in this specification) in the form of lists. The HDD 2004 stores image data together with application programs. Information to be held even after power OFF may be stored in the HDD 2004.

To the CPU 2001, an operation unit I/F (operation unit interface) 2006, network I/F (network interface) 2010, modem 2050, and image bus I/F (image bus interface) 2005 are connected via a system bus 2007 as well as the ROM 2003 and RAM 2002.

The operation unit I/F 2006 is an interface with an operation unit 2012 having a touch panel, and outputs image data to be displayed on the operation unit 2012 to it. Also, the operation unit I/F 2006 outputs information input by the user at the operation unit 2012 to the CPU 2001.

The network I/F 2010 is connected to the LAN 1006 and exchanges information with respective apparatuses connected to the LAN 1006 via the LAN 1006. The modem 2050 is connected to the public communication line 1007, and exchanges information via the public communication line 1007.

The image bus I/F 2005 is a bus bridge which connects the system bus 2007 and an image bus 2008 that transfers image data at high speed, and converts data structures. On the image bus 2008, a raster image processor (to be referred to as RIP hereinafter) 2060, device I/F 2020, scanner image processor 2080, printer image processor 2090, image rotation unit 2030, thumbnail image generation unit 2035, and image compression unit 2040 are connected. The RIP 2060 is a processor for developing PDL codes into bitmap image data. To the device I/F 2020, the scanner 2070 and printer 2095 are connected. The device I/F 2020 converts synchronous image data into asynchronous image data and vice versa.

The scanner image processor 2080 performs correction, modification, and edition on input image data. The printer image processor 2090 applies printer correction, resolution conversion, and the like to print output image data. The image rotation unit 2030 rotates image data. The image compression unit 2040 compresses multi-valued image data to JPEG data, compresses binary image data to JBIG data, MMR data, MH data, or the like, and performs their decompression processes.

(3) Hardware Arrangement of Scanner 2070 and Printer 2095

Figure 3:
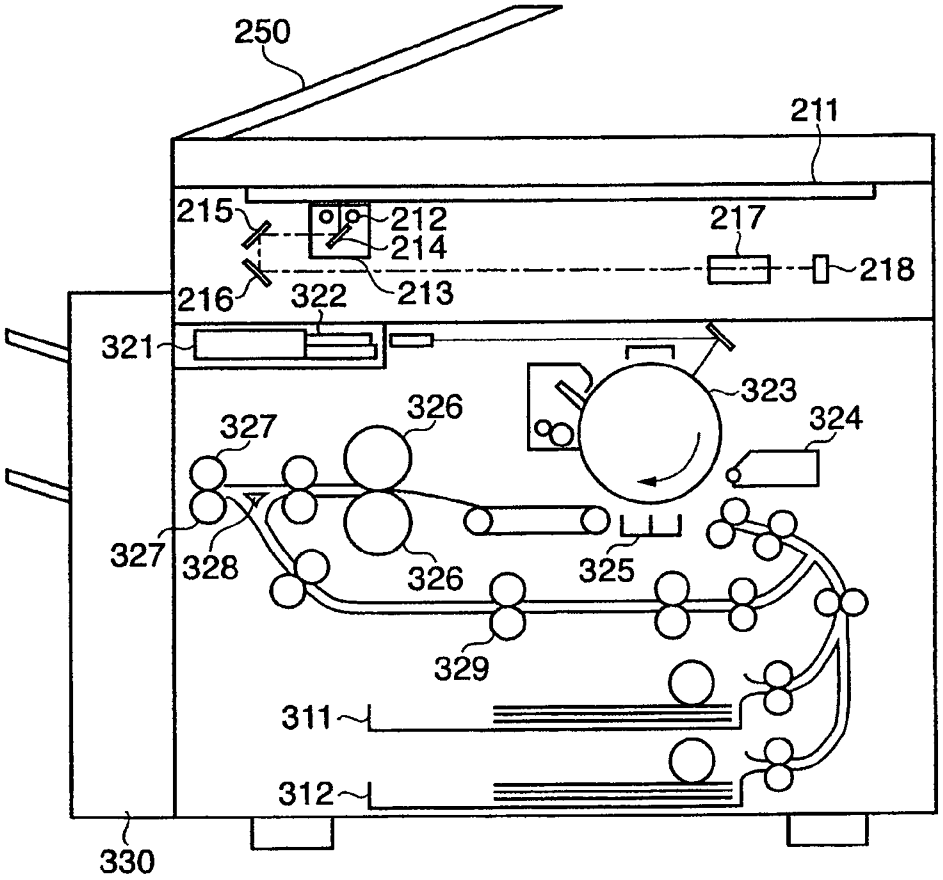
FIG. 3 is a sectional view showing the hardware arrangement of a scanner unit and a printer unit.

FIG. 3 is a sectional view illustrating the hardware arrangement of the scanner (reader) 2070 and printer 2095 of the copying machine 1001 shown in FIG. 1.

The scanner 2070 and printer 2095 are integrally arranged, as shown in FIG. 3. The scanner 2070 mounts a document feeder unit 250. The document feeder unit 250 feeds documents one by one onto a platen glass 211 in turn from the uppermost one, and discharges a document from the platen glass 211 to a discharge tray (not shown) every time the scan operation of the document is completed.

When a document is fed onto the platen glass 211, the scanner 2070 turns on a lamp 212, and starts movement of a moving unit 213 the document on the platen glass 211 is scanned by the movement of the moving unit 213. During this scanning, light reflected by the document is guided to a CCD image sensor (to be referred to as CCD hereinafter) 218 via mirrors 214, 215, and 216, and a lens 217, and an image on the document is formed on the imaging surface of the CCD 218. The CCD 218 converts the image formed on the imaging surface into an electrical signal, which undergoes predetermined processing, and is then input to a controller unit 2000.

The printer 2095 has a laser driver 321, which drives a laser emission unit 322 on the basis of image data input from the controller unit 2000. As a result, the laser emission unit 322 emits a laser beam according to the image data, and irradiates a photosensitive drum 323 while being scanned. An electrostatic latent image is formed on the photosensitive drum 323 by the irradiated laser beam, and is visualized as a toner image by toner supplied from a developer 324. A print sheet fed from a cassette 311 or 312 is conveyed to a nip between the photosensitive drum 323 and a transfer unit 325 via a convey path in synchronism with the irradiation timing of the laser beam, and the toner image on the photosensitive drum 323 is transferred onto the fed print sheet by the transfer unit 325.

The print sheet on which the toner image is transferred is fed to a fixing roller pair (heating roller and pressure roller) 326 via a conveyance belt, and the fixing roller pair 326 applies heat and pressure to the print sheet to fix the toner image on the print sheet on it. The print sheet that has left this fixing roller pair 326 is discharged into a discharge unit 330 by a discharge roller pair 327. The discharge unit 330 comprises a sheet processing device which can apply post-processes such as sorting, stapling, and the like. When a two-sided print mode is set, the rotational direction of the discharge roller pair 327 is reversed after the print sheet is conveyed to the discharge roller pair 327, and the print sheet is then guided to a re-feed conveyance path 329 by a flapper 328. The print sheet guided to the re-feed conveyance path 329 is re-fed to the nip between the photosensitive drum 323 and transfer unit 325 again at the aforementioned timing, and a toner image is transferred onto the reverse face of this print sheet.

(4) Outer Appearance of Operation Unit 2012

Figure 4:
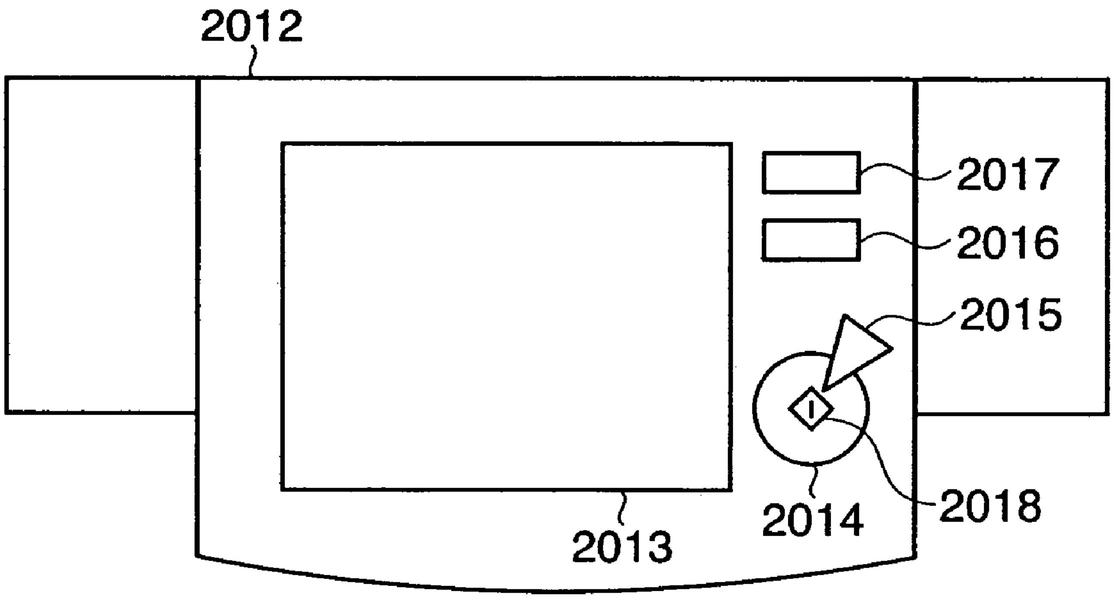
FIG. 4 is a view showing the outer appearance of an operation unit.

FIG. 4 shows the arrangement of the operation unit 2012. An LCD display unit 2013 has an LCD screen on which a touch panel sheet is adhered. The LCD display unit 2013 displays an operation window of the system, and when any of keys displayed on the LCD display unit 2013 is pressed, the LCD display unit 2013 sends its position information to the CPU 2001 of the controller unit 2000. A start key 2014 is used, e.g., when the scan operation of a document image is to be started.

The start key 2014 has two-color, i.e., green and red LEDs 2018 at its central portion, and indicates based on the color of the ON LED if the start key 2014 is ready to use. A stop key 2015 is used to stop an active operation.

An ID key 2016 is used when the user inputs a user ID. The user inputs the ID and password when he or she logs into the copying machine 1001. A reset key 2017 is used to reset settings from the operation unit.

(5) Operation Unit Window

Figure 5:
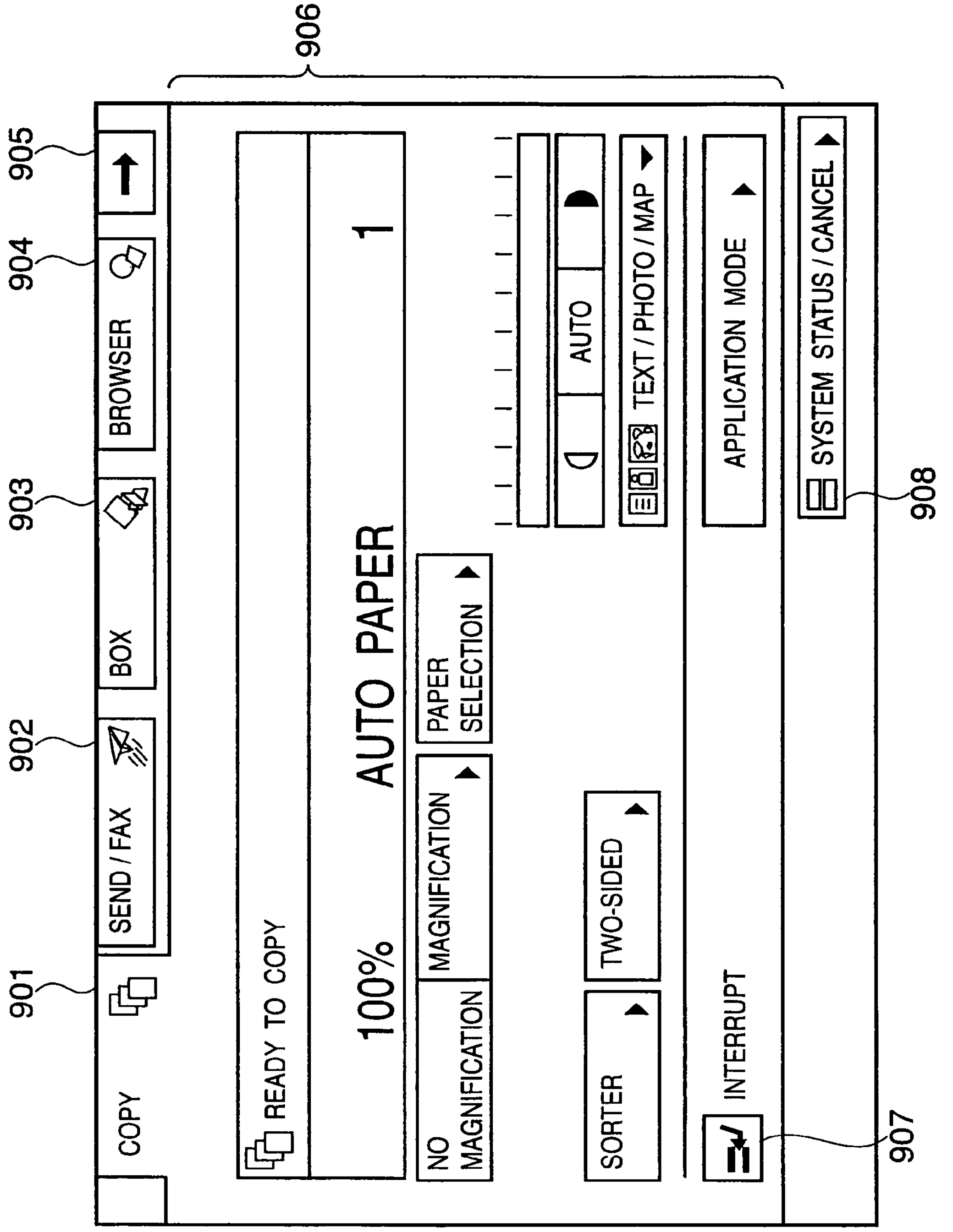
FIG. 5 is a view showing an example of an operation window (standard window)

FIG. 5 shows an example of an operation window to be displayed on the operation unit 2012.

Touch keys which represent tabs for a plurality of functions such as copy (901), send/FAX (902), box (903), and browser (904) are displayed on the screen of the operation unit. A program required to display a Web browser is installed in the ROM 2003 of the controller unit 2000, and the Web browser can be displayed in response to an instruction on the operation unit 2012. The program required to display the Web browser may be stored in the HDD 2004.

When the controller unit 2000 has five or more functions, a right-arrow key 905 is displayed on the right side of the four tabs of the copy, send/FAX, box, and browser functions. Upon depression of the right-arrow key 905, for example, a tab of a function as a category other than the aforementioned ones (e.g., "printer" or the like) can be displayed.

FIG. 5 also shows an initial window of the copy function upon depression of the copy touch key 901. A display area 906 pertains to the copy function: a field that displays "ready to copy" displays status displayed by the copy function on the upper portion of FIG. 5, and a field that displays the magnification, selected paper source, and the number of copies is located below. As touch keys used to set operation modes of the copy function, a no-magnification key, magnification key, paper selection key, sorter key, two-sided copy key, interrupt key, left- and right-arrow keys respectively used to reduce and increase a density of text and image for density adjustment, and auto key used to automatically adjust the density are displayed. Upon designation of operation modes which cannot be displayed on the initial window, an application mode key is pressed to hierarchically display setting windows in the area 906.

A display area 907 displays status of the copying machine function (901). For example, this area displays, for example, an alarm message such as jam or the like, and a status message indicating that PDL print processing is in progress during PDL print processing.

When a system status/cancel touch key 908 is pressed, a window used to display device information of the copy function (901), and a window used to display print job status are displayed (not shown), and a job cancel instruction can be input from these windows.

Upon depression of the touch key of the send/FAX touch key 902, a setting window (not shown) used to send an image scanned by the copy function (901) to an apparatus on the LAN 906 via e-mail or FTP, or to send such an image via FAX using the public communication line 1007 is displayed.

Upon depression of the box touch key 903, a setting window (not shown) used to save an image scanned by the copy function (901) in the box area of the hard disk 2004, to designate and print image data saved in the box area, or to send the designated image data to an apparatus on the LAN 1006 is displayed.

Figure 6:
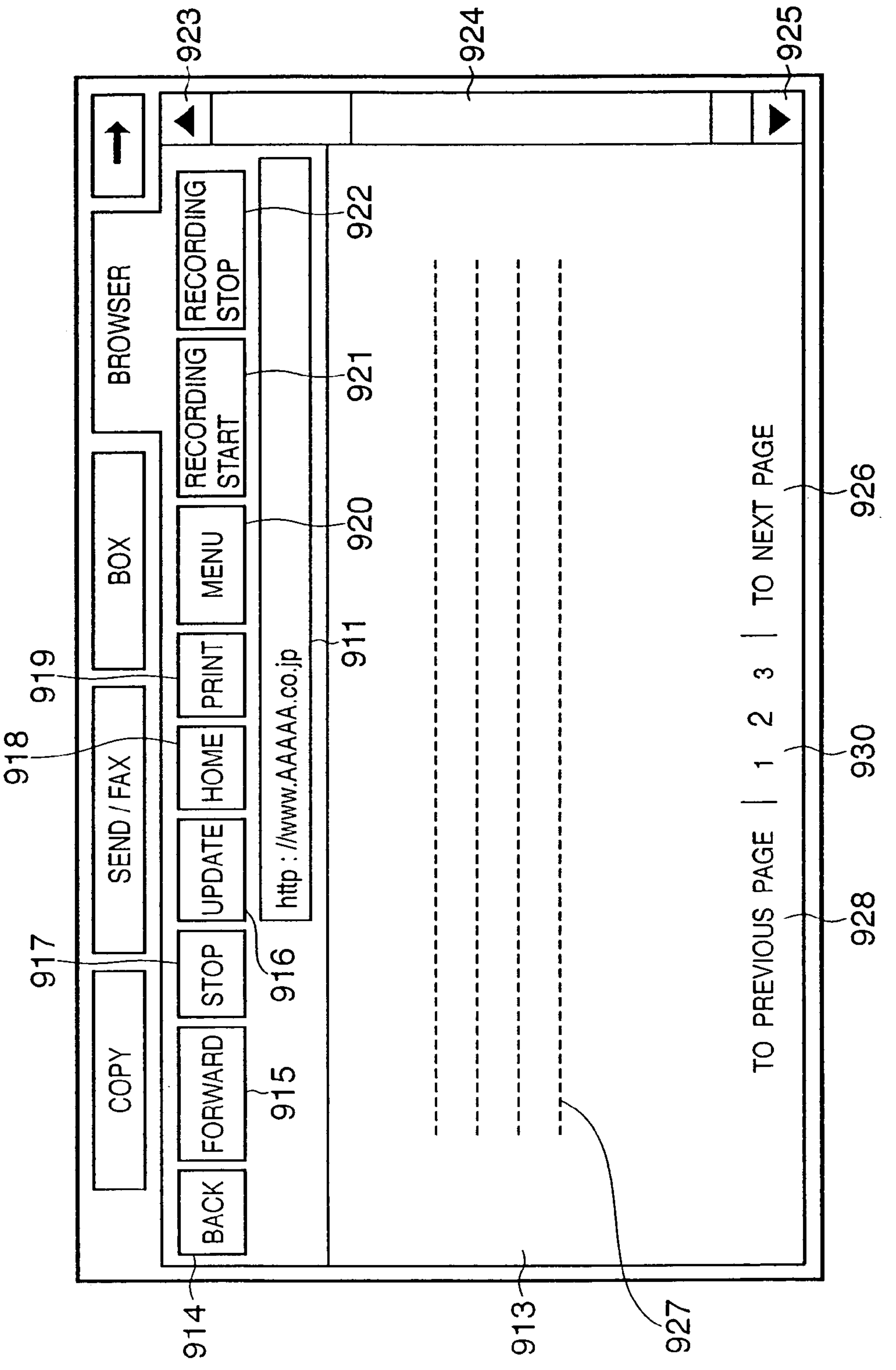
FIG. 6 is a view showing a browser startup window.

Upon depression of the browser touch key 904, a browser window shown in FIG. 6 is opened. A URL input field 911 is touched when a Web page is to be opened by designating its URL. When this field is touched, a soft keyboard (not shown) is displayed, and the user can designate the URL.

A display area 913 is that of a Web page. Reference numeral 927 denotes information of a Web page. A back key 914 is used to display the previous page. A forward key 915 is used to display the next page. An update key 916 is used to re-load and display the currently displayed page. A stop key 917 is used to cancel loading of the page. A home key 918 is used to move to a home page which is set in advance.

Reference numeral 924 denotes a scroll bar used to scroll the display area 913. Reference numeral 923 denotes a button used to scroll the display area 913 upward; and 925, a button used to scroll the display area 913 downward. Reference numerals 926, 928, and 930 denote examples of information described in a given Web page. When such Web page is displayed, information described in this Web page consists of three pages, and the user can open his or her favorite one of the three pages by touching any desired one of displayed page number 930. For example, in this case, a numeral "2" is displayed to be larger than other numerals among the displayed numbers 930, and this indicates that the second page is open. This is merely an example, and the Web-page creator freely determines such window display rules. The information 928 is link text used to open the previous page of the current second page, i.e., the first page, and a link to the URL of the Web contents of the first page is set. The information 926 is link text used to open the third page, and a link to the URL of the Web contents of the third page is set.

A recording start button 921 is used to start recording of the URLs of the browsed Web pages. A recording stop button 922 is used to stop the recording of the URLs of the browsed Web pages. The URLs of the Web pages displayed on the operation window during an interval from a timing when the recording start button 921 is pressed to a timing when the recording stop button 922 is pressed are stored as a URL table on the non-volatile memory portion of the RAM 2002.

The URL table will be described below with reference to FIG. 7. The URL table has a configuration shown in FIG. 7. "Page(n)" indicates the browsed page order, and "URL" indicates the browsed URL information. The URL table accumulates the URLs of the Web pages which are opened from a timing when the recording start button 921 is pressed to a timing when the recording stop button 922 is pressed. The URL table shown in FIG. 7 indicates that three Web pages are browsed from a timing when the recording start button 921 is pressed to a timing when the recording stop button 922 is pressed, and this table stores the URLs corresponding to these pages.

In a case where a given Web page consists of, e.g., three pages, as shown in FIG. 6, and the user alternately displays the first to third pages by touching the information 930, once all the URLs are recorded, even though the same page as that previously displayed is displayed, the same URL is not recorded. That is, three different URLs for the first to third pages are recorded in the URL table in this example. For example, consider a case where the user's instructions are "recording→start display 2nd page→display 1st page→display 2nd page→display 3rd page→recording stop". In this case, upon depression of the recording start button, the values of the URL table are initialized. In other words, no data is stored in the table. Since the second page is displayed initially, the URL of the second Web page is registered in Page=1 of the URL table. Since the first page is browsed next, the URL of the first page of the Web page is registered in Page=2. When the second page is displayed again, it is checked in turn from Page=1 in this embodiment whether or not the same URL is stored. If the same URL is not stored, that URL is registered. Since the URL information of the second page has already been registered in Page=1, it is not registered. When the third page is displayed subsequently, since its URL is not registered in the URL table, Page=3 registers the URL of the third page.

Note that FIG. 7 shows an example in which three Web pages are opened in the same Web site termed "AAAAA.co.jp". However, opened pages may be from different Web sites.

Reference numeral 920 denotes a button used to open a window for print settings. Upon depression of this button, a window used for print settings (the number of copies, two-sided printing, sort, and the like) of the Web pages is displayed. By pressing a print start button 919, print processing starts. The print start button 919 functions as a print mode designation key. Upon depression of this button, a print mode setting dialog shown in FIG. 8 is displayed.

Figure 8:
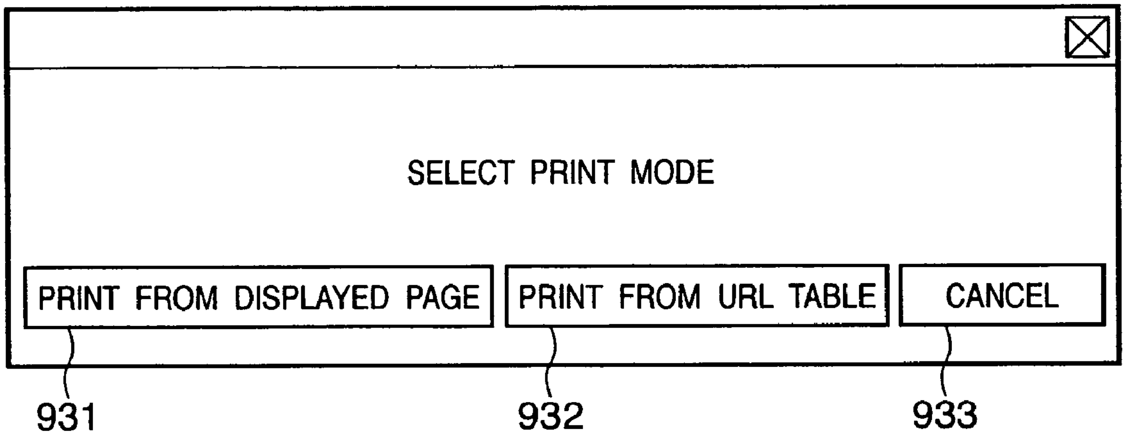
FIG. 8 is a view showing a popup dialog upon selection of a print mode.

On the print mode setting dialog shown in FIG. 8, a "print from displayed page" button 931 used to print only the currently displayed page, a "print from URL table" button 932 used to sequentially load all the URLs stored in the URL table shown in FIG. 7 and print the corresponding pages, and a cancel button 933 used to cancel print processing are displayed. When the user selects either the "print from displayed page" button 931 or "print from URL table" button 932, a print preview window shown in FIG. 9 opens.

Figure 9:
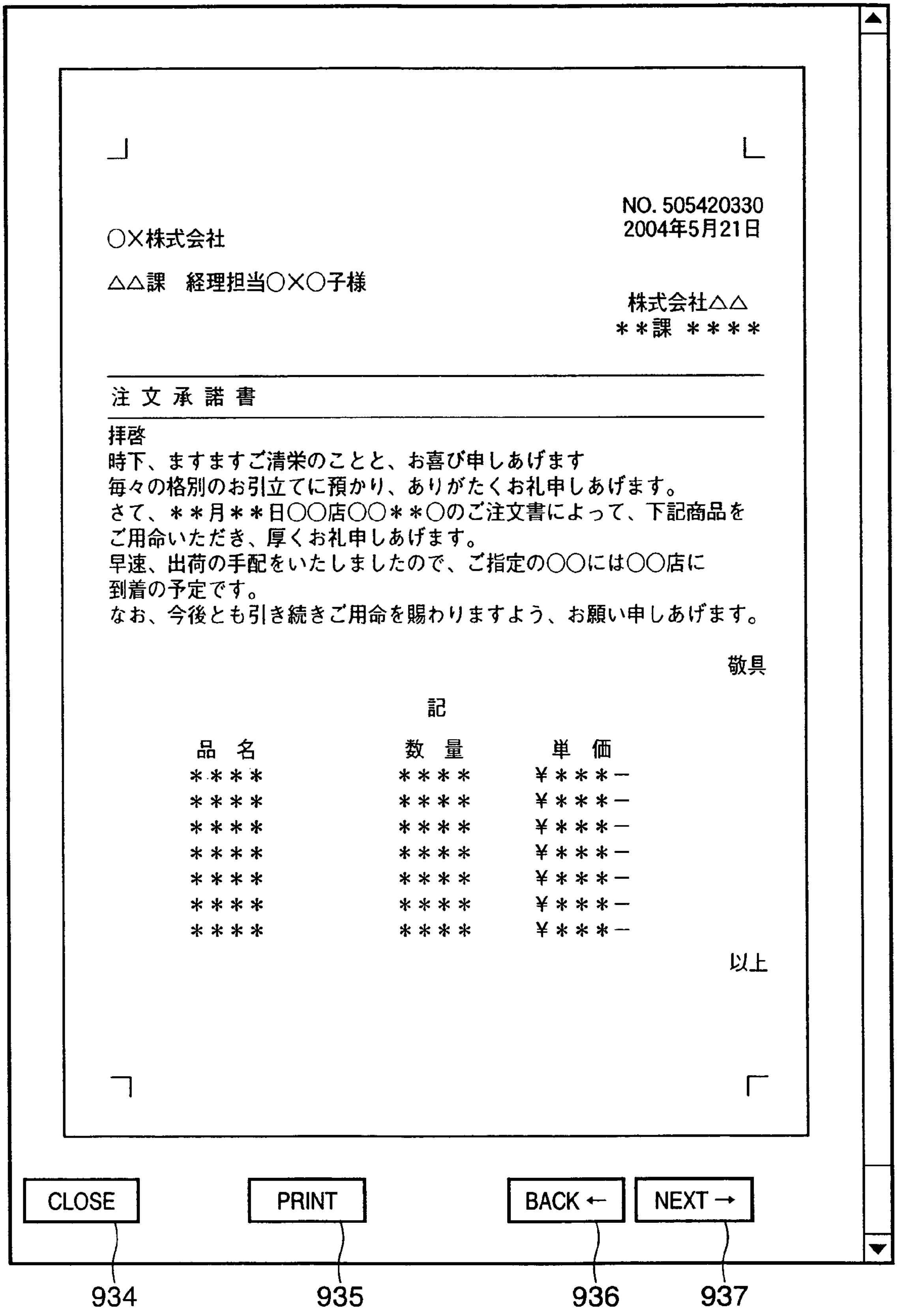
FIG. 9 is a view showing a print preview window.

Referring to FIG. 9, reference numeral 934 denotes a button used to close the print preview window; 935, a button used to print the displayed print preview window; 936, a button used to display the previous page of the print preview window; and 937, a button used to display the next page of the print preview window. Upon depression of the print button 935 after confirmation of the preview, a print setting dialog (not shown) is displayed. The print setting dialog displays setting items about a method of printing a frame, and setting items about printing (the number of copies, two-sided printing, sort, and the like), and print processing starts upon depression of a print start instruction button (not shown). Note that the order of pages to be printed can be changed by operating a button (not shown) on the print preview window. Note that the order of pages to be printed may be changed on the print setting dialog in FIG. 8, or may be realized by additionally providing a window (not shown) that displays a list like the URL table shown in FIG. 7, and manually changing the order of the list.

(6) Description of PDL

PDL (Page Description Language: to be abbreviated as PDL hereinafter) data will be described below. PDL represented by PostScript® language of Adobe Systems Corporation is classified into the following three elements.

(a) Image description based on character codes (b) Image description based on graphics code (c) Image description based on raster image data That is, PDL is a language that describes an image formed by combining the above elements, and data described in that language is called PDL data.

Figures 10A, 10B:
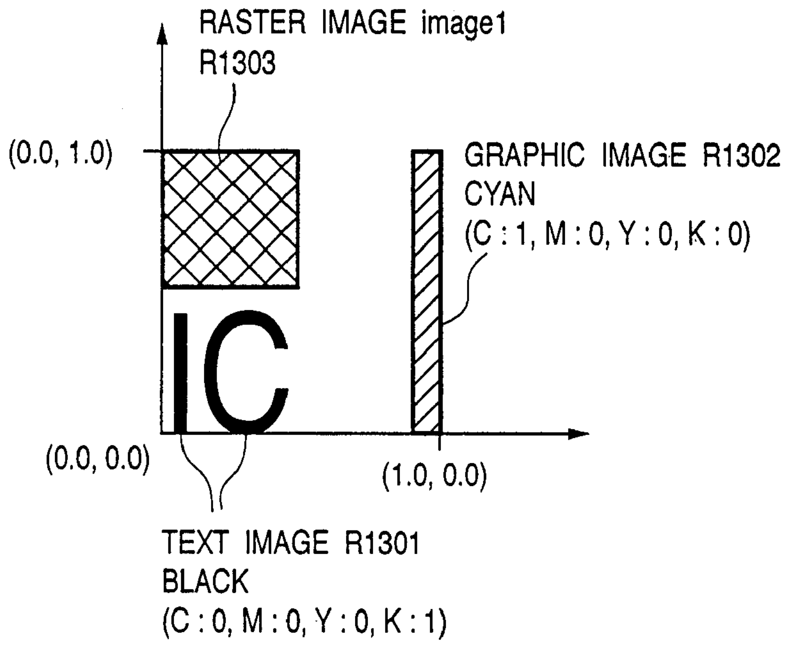
FIGS. 10A and 10B are views for explaining PDL data.

FIG. 10A shows a description example of text information R1301 shown in FIG. 10B. L1311 indicates a description that designates a character color, and numerals in parentheses represent the densities of Cyan, Magenta, Yellow, and Black in turn. The minimum density is 0.0, and the maximum density is 1.0. L1311 designates a character color=black. In L1312, a character string "IC" is substituted in a variable String1. In L1313 the first and second parameters indicate the x- and y-coordinates of the start coordinate position on a sheet where the character string is to be laid out, the third parameter indicates the character size, the fourth parameter indicates the character interval, and the fifth parameter indicates the character string to be laid out. As summarized, L1313 instructs to lay out the character string "IC" from a coordinate position (0.0, 0.0) to have a size=0.3 and interval=0.1.

Likewise, in a description example of graphics information R1302 shown in FIG. 10B, L1321 designates a line color as in L1311. In this case, L1321 designates Cyan. L1322 designates to draw a line. That is, the first and second parameters indicate the x- and y-coordinates of the start coordinate position of the line, and the third and fourth parameters indicate the x- and y-coordinates of the end coordinate position of the line. The fifth parameter indicates the thickness of the line.

Furthermore, in a description example of raster image information, in L1331, a raster image is substituted in a variable Image1. In this instruction, the first parameter indicates the image type and the number of color components of the raster image, the second parameter indicates the number of bits per color component, and the third and fourth parameters indicate the size of the raster image in both the x- and y-directions. The fifth and subsequent parameters indicate the raster image data. The number of raster image data is the product of the number of color components which form one pixel, the image size in the x-direction and the image size in the y-direction. In L1331, since the CMYK image is formed of four color components (Cyan, Magenta, Yellow, Black), the number of raster image data is (4×5×5)=100. Next, L1332 indicates that Image1 is to be laid out from a coordinate position (0.0, 0.5) to have a size of 0.5×0.5.

FIG. 10B shows a state in which the above three image descriptions in one page are interpreted and rasterized to raster image data. R1301, R1302, and R1303 are respectively obtained by developing the corresponding PDL data. These raster image data are developed on the RAM 2002 (or HDD 2004) for respective C, M, Y, and K color components in practice. For example, C=0, M=0, Y=0, and K=255 for R1301 are written in the C, M, Y, and K areas of the RAM 2002, and C=255, M=0, Y=0, and K=0 are written in the C, M, Y, and K areas for R1302.

PDL data to be handled by the copying machine 1001 is written on the RAM 2002 (or HDD 2004) as PDL data intact or the rasterized image data as described above, and is saved as needed.

(7) Document Integration of Web Page

A document integration method of browsed Web pages will be described below using FIGS. 11A, 11B, and 12.

In order to attain document integration, Web pages must be converted in advance into PDL data in a format that allows edit processing for respective pages. In order to generate data in the format for respective pages, a PDF format is well known, and it is ideal to convert Web pages using an Acrobat® Writer available from Adobe® Systems Corporation.

Figure 11A:
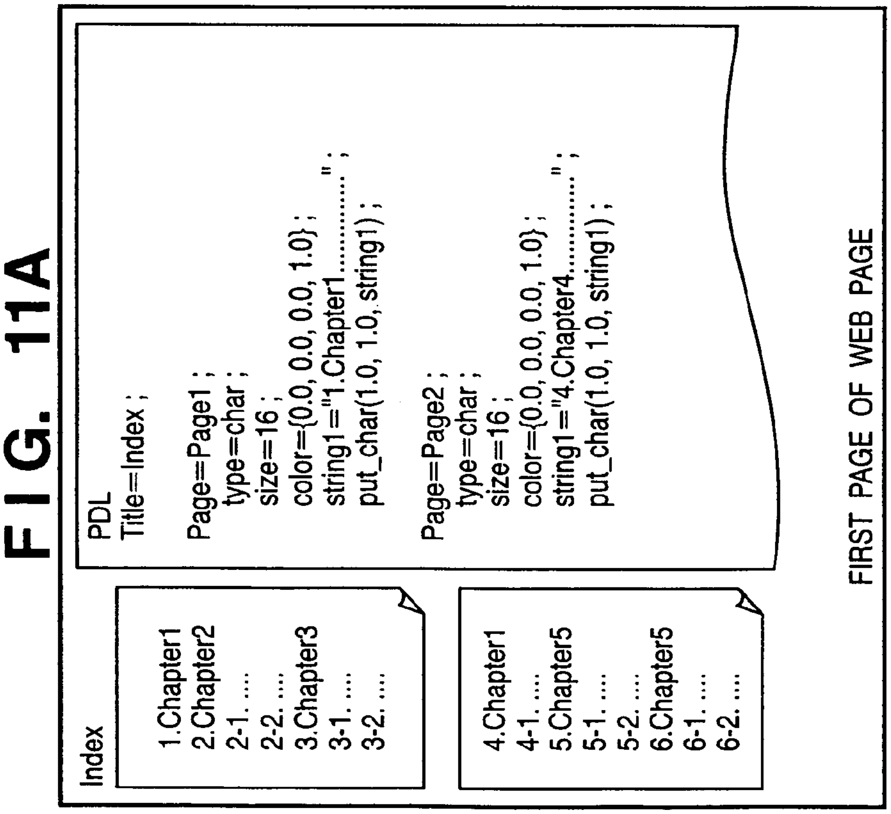
FIGS. 11A and 11B are views showing original PDL files before integration.
Figure 11B:
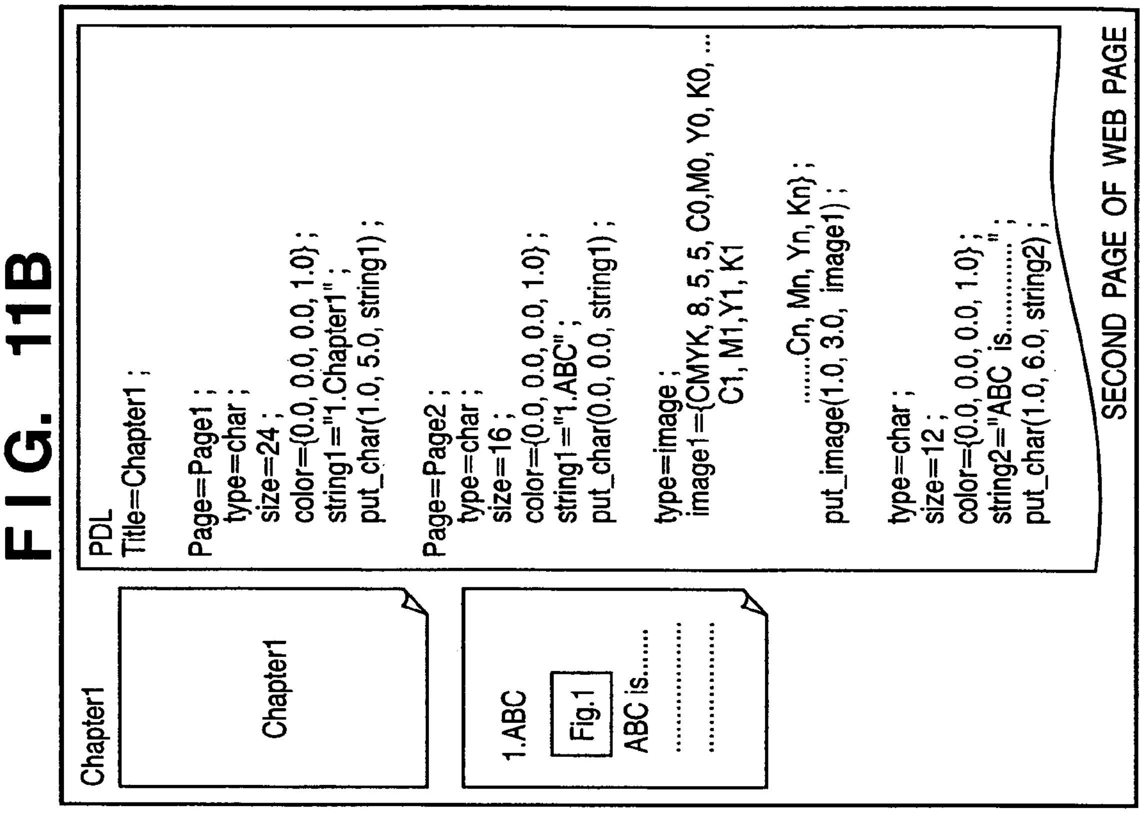

FIG. 11A shows the first page of a Web page starting from Index, and Chapter1 of FIG. 11B represents the second page of the Web page. A document of the "first page of the Web page" is a single and long page, but is divided into two pages if it is described in the PDL. The same applies to a document of the "second page of the Web page". FIGS. 11A and 11B are expressed by PDL data, and are converted in advance into PDL data to allow edit processing for respective pages.

If data having a non-page format is input, such data is rasterized by the RIP 2060 of the copying machine 1001, and is then processed by the image compression/data conversion unit for respective pages and is compressed as needed, so as to describe data in PDL data for respective pages. Then, the data can be dealt in unit of page.

Integration of PDL data will be described below using FIGS. 11A, 11B, and 12. FIGS. 11A and 11B show PDL data obtained by converting the first and second pages of the Web page into PDL format, respectively. FIG. 12 shows PDL data obtained by reading and integrating both the original PDL files shown in FIGS. 11A and 11B, and these original PDL files are converted into one PDL data.

Figure 12:
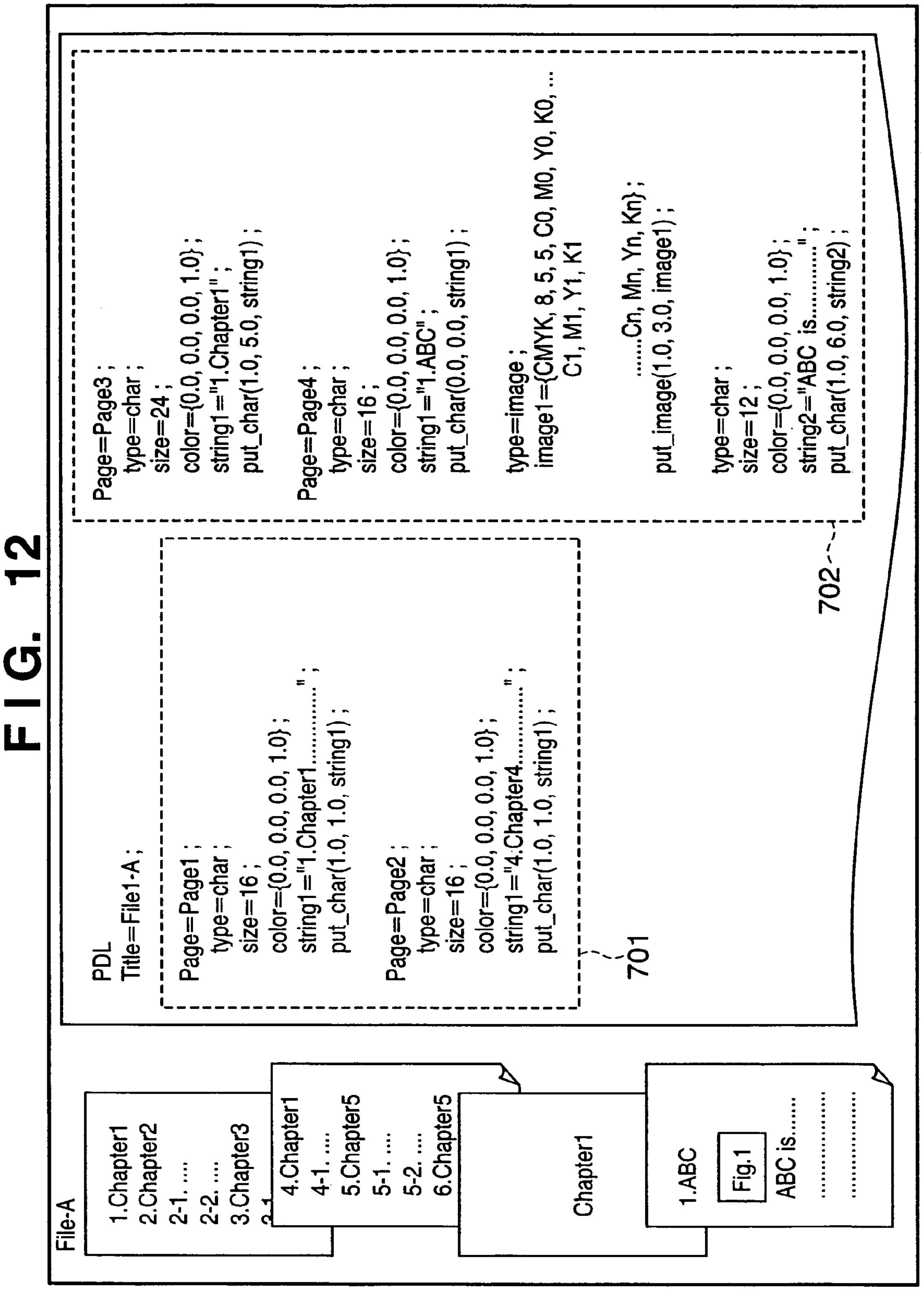
FIG. 12 is a view showing integrated PDL data.

FIG. 12 shows a merged file and PDL data. An "Index" part 701 corresponding to the first page of the Web page is converted into data including Page1 and Page2, and a "Chapter1" part 702 corresponding to the second page of the Web page is converted into data including Page3 and Page4.

Figure 13:
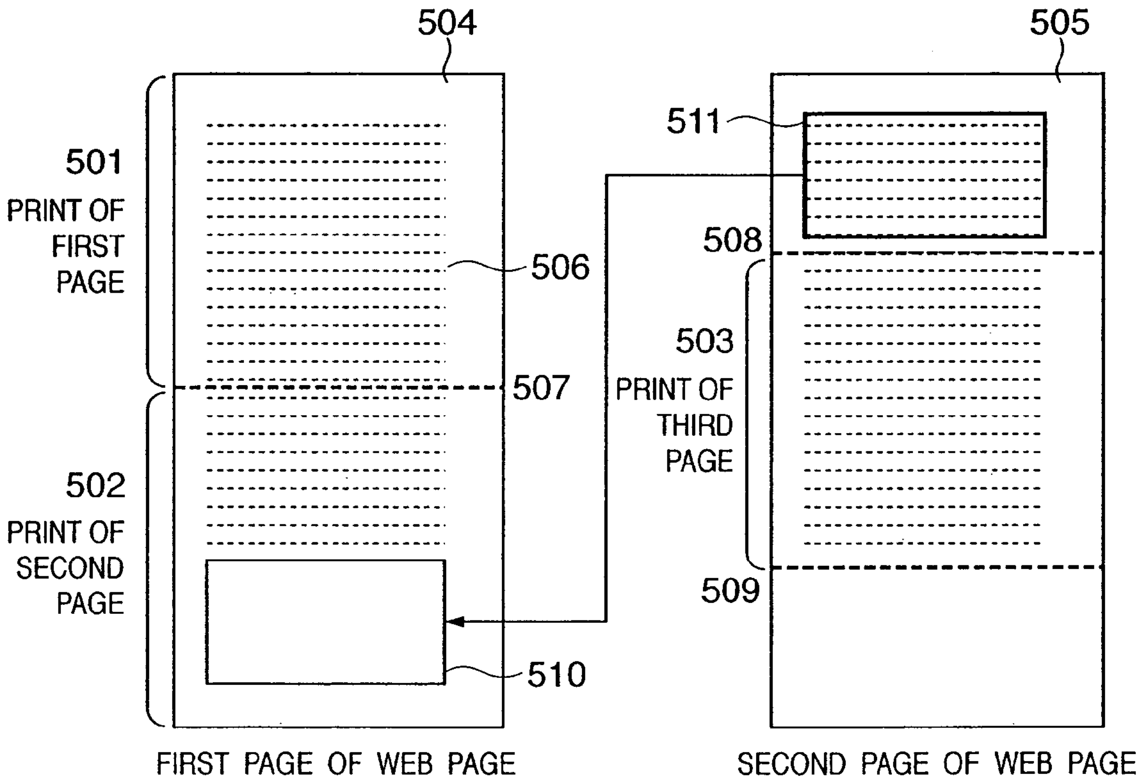
FIG. 13 is a conceptual view of PDL data integration and a page separation.

FIGS. 11A and 11B will be described below using FIG. 13. Reference numeral 504 denotes data of the first page of the Web page. Reference numeral 505 denotes data of the second page of the Web page. Reference numeral 506 denotes information described in the Web pages. Reference numerals 507, 508, and 509 denote page separators in the PDL. For example, the data 504 indicates that the Web page is separated into two pages at the position of the page separator 507, and these two pages are output as print data 501 for the first page and 502 for the second page upon printing. Reference numeral 510 denotes a blank which may be formed on a paper sheet of the second page, and in which information 511 of the Web page is packed in the PDL level. That is, the first and second pages of the Web page are converted into PDL data, and are merged. Then, page separators are inserted at a position where no information is omitted in correspondence with the output paper size. In this manner, no blank is formed at the area 510, thus saving paper sheets.

First Embodiment

Figure 14:
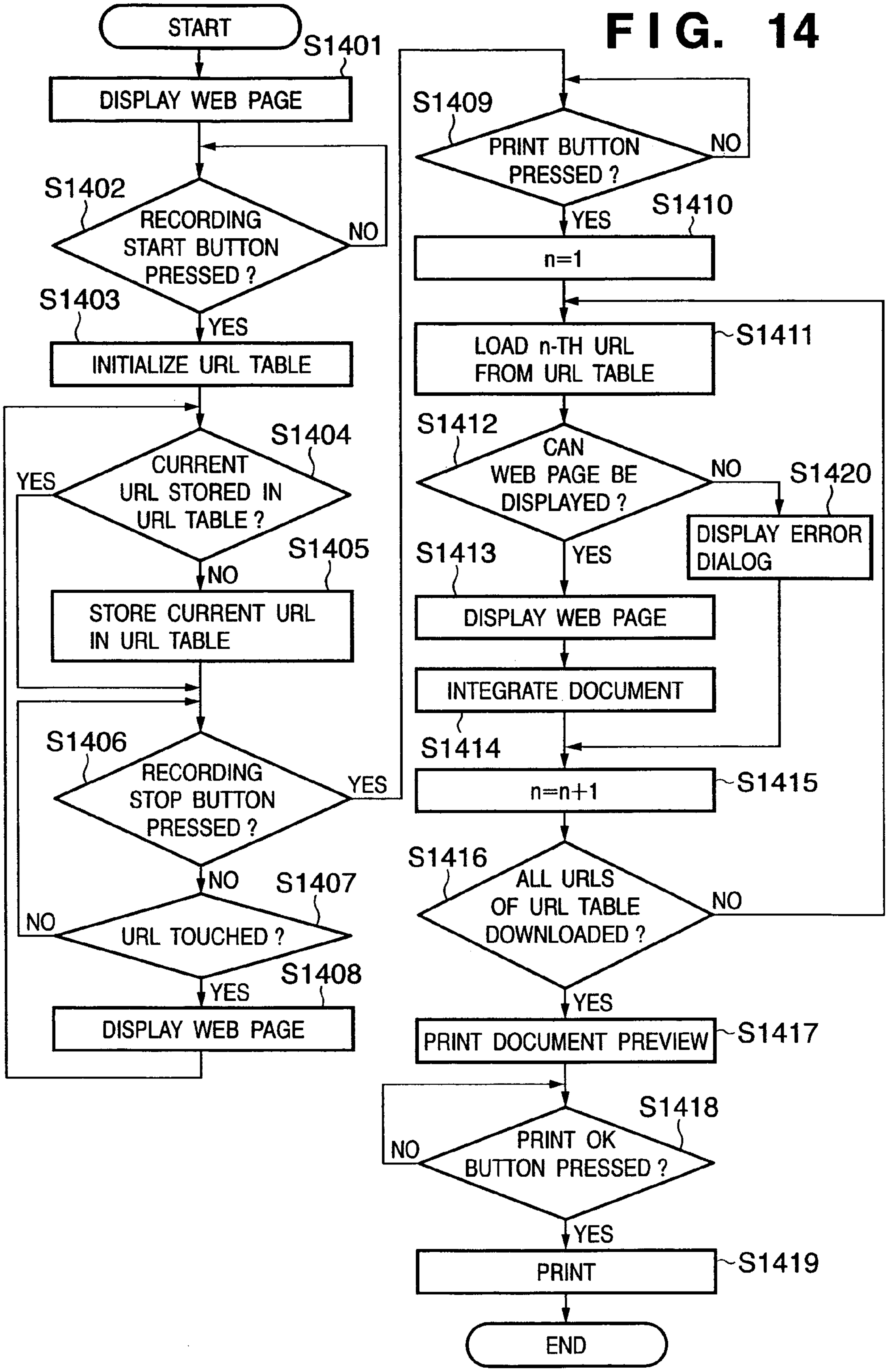
FIG. 14 is a flowchart for explaining print processing of a Web page according to the first embodiment.

FIG. 14 is a flowchart for explaining the print operation of a Web page according to the first embodiment of the present invention.

In step S1401, a Web page display window shown in FIG. 6 is displayed upon depression of the browser button 904 shown in FIG. 5. It is checked in step S1402 whether or not the recording start button 921 is pressed. If the recording start button 921 is pressed, the URL table is initialized in step S1403 so that the URL table stores no data.

In step S1404, the URL table is searched from Page=1 to check whether or not a URL to be recorded has already been described in the URL table. If the URL to be recorded has already be registered, it is not registered in the URL table, and the flow jumps to step S1406. If the URL to be recorded is not registered, the URL of the currently displayed Web page is stored into the URL table in step S1405.

It is checked in step S1406 whether or not the recording stop button 922 is pressed. If the recording stop button 922 is not pressed, it is further checked in step S1407 whether or not the link button used to select another URL is touched. If no button is touched, the flow returns to step S1406. If the link button is touched in step S1407 to select another page, a Web page is displayed in step S1408, and it is further checked in step S1404 whether or not the URL of that Web page has already been registered in the URL table. For example, in case of Web pages which form one document by three pages, the processes in steps S1404 to S1408 are repeated once again, and if the control reaches step S1405 again, then the three URLs are recorded in the URL table, as shown in FIG. 7. If the recording stop button 922 is pressed in step S1406, the URL recording is stopped, and the flow advances to step S1409.

It is checked in step S1409 whether or not the print button 919 is pressed. If the print button 919 is pressed, a number reference value n in the URL table is reset to n=1 in step S1410. In step S1411, the n-th URL in the URL table is loaded. Since n=1 at this time, the first URL in the URL table is loaded. In this case, since http://AAAAA.co.jp/index2.html in FIG. 7 corresponds to the first page, this URL is loaded. It is checked in step S1412 whether or not a Web page can be displayed. If Web page data cannot be downloaded from the URL destination and causes an error display, a dialog indicating an error is displayed in step S1420. Furthermore, in step S1415, a reference counter of the URL table is increment by +1 (n=n+1). By contrast, if the Web page can be browsed in step S1412, that Web page is displayed in step S1413, and Web pages are integrated in step S1414. As the integration method, as described above, all Web pages in the URL table are converted into PDL data, which are integrated as if they were a single and long document. Then, page separators are inserted in correspondence with the output paper size when the integrated document is output.

If it is confirmed in step S1416 that the Web pages are downloaded from all the URLs in the URL table, a preview of the print document is displayed in step S1417. The preview window is as shown in FIG. 9, and the user determines based on the preview if he or she wants to print it. If a print OK button is pressed in step S1418 to determine to execute print processing, page separators are inserted. In step S1419, the already generated PDL data is rasterized by the RIP 2060 and raster image data is printed out.

Figure 15:
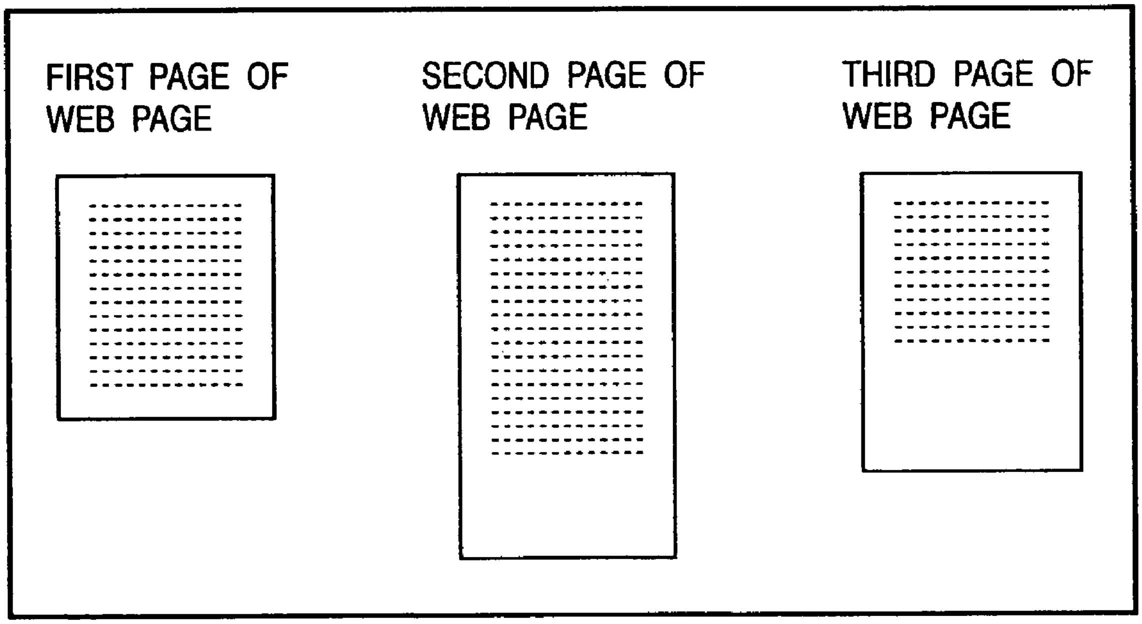
FIG. 15 is a view showing a specific example of a Web page loaded from a URL table.
Figure 16:
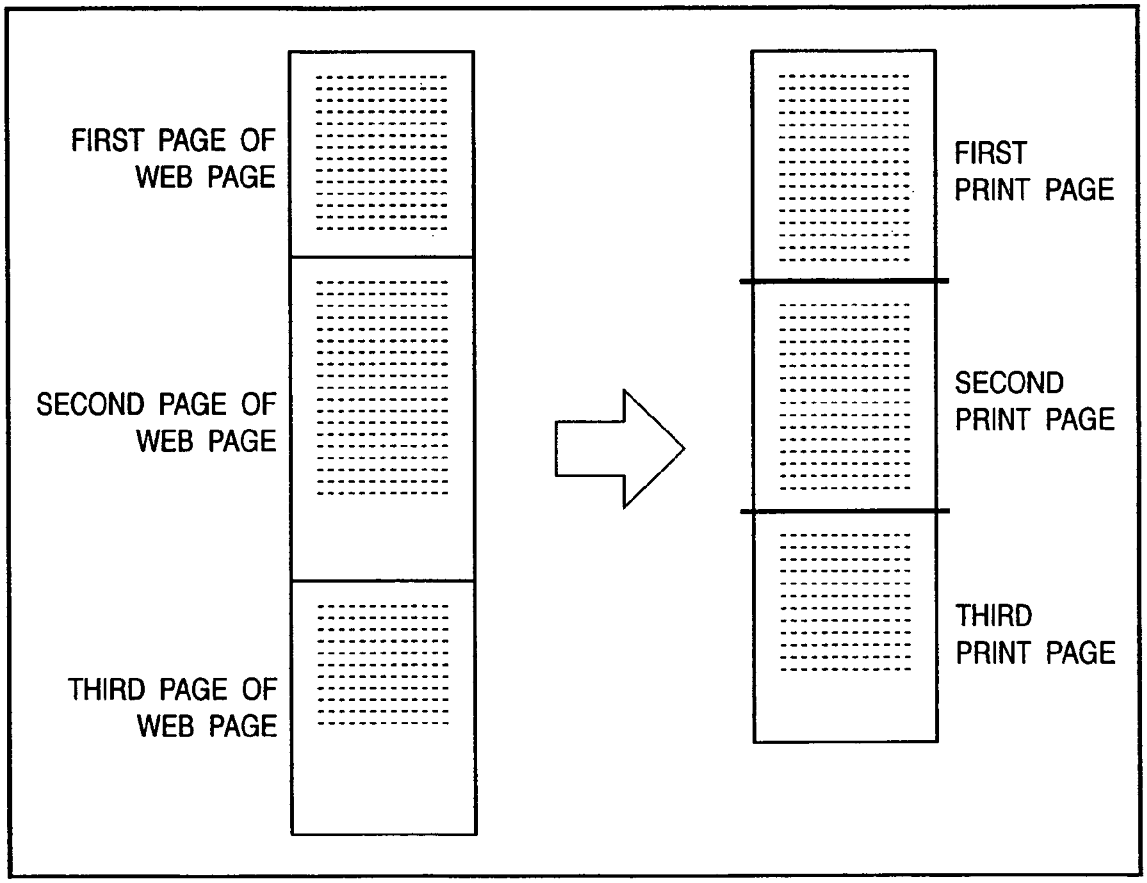
FIG. 16 is a view showing processing for converting a Web page into PDL data and performing document integration.

FIGS. 15 and 16 show the print result of three Web pages using the present invention. As shown in FIG. 15, for example, there are Web pages for three pages loaded from the URL table. Note that respective Web pages have different lengths. As shown in FIG. 16, respective Web pages are converted into PDL data, data are packed in correspondence with the output paper size, and page separators are inserted.

Upon printing from the URL list shown in FIG. 7, if a 4in1, two-sided print mode is designated by designating a print layout, Web pages can be loaded from the URL list, and can be imposed in the designated layout upon printing.

Figure 17:
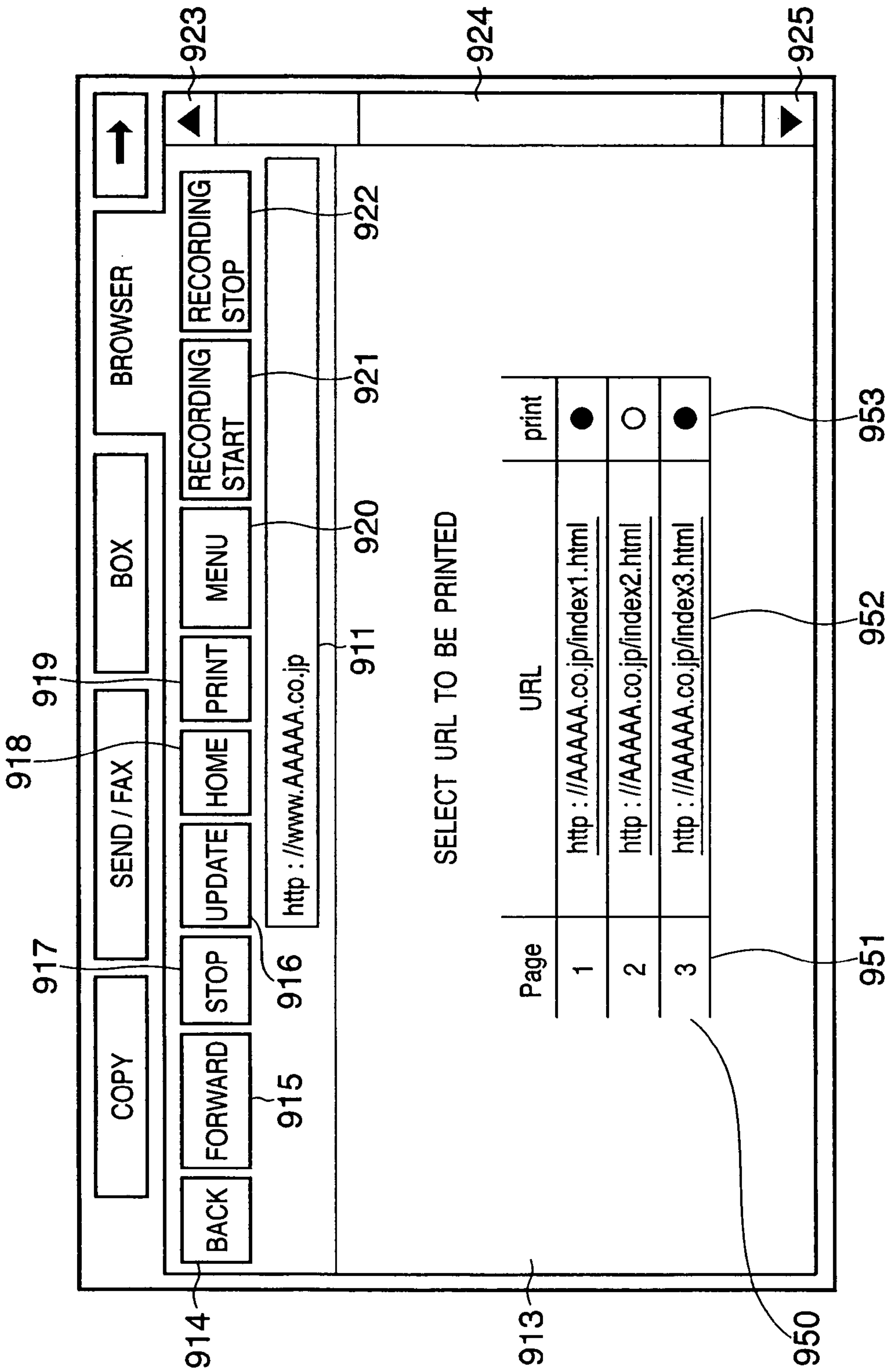
FIG. 17 is a view showing an operation window in another mode.

The present invention also includes a method of displaying the URL list shown in FIG. 7 on an operation window shown in FIG. 17. A URL list 950 shown in FIG. 17 includes a recorded URL column 952 and Page number column 951. In a Print column 953, the user can select ● (print)/○ (not print) using a toggle switch alternately indicating ON/OFF every time he or she touches. FIG. 17 shows that Page 1 and Page 3 are to be printed, and Page 2 is not to be printed.

Figure 18:
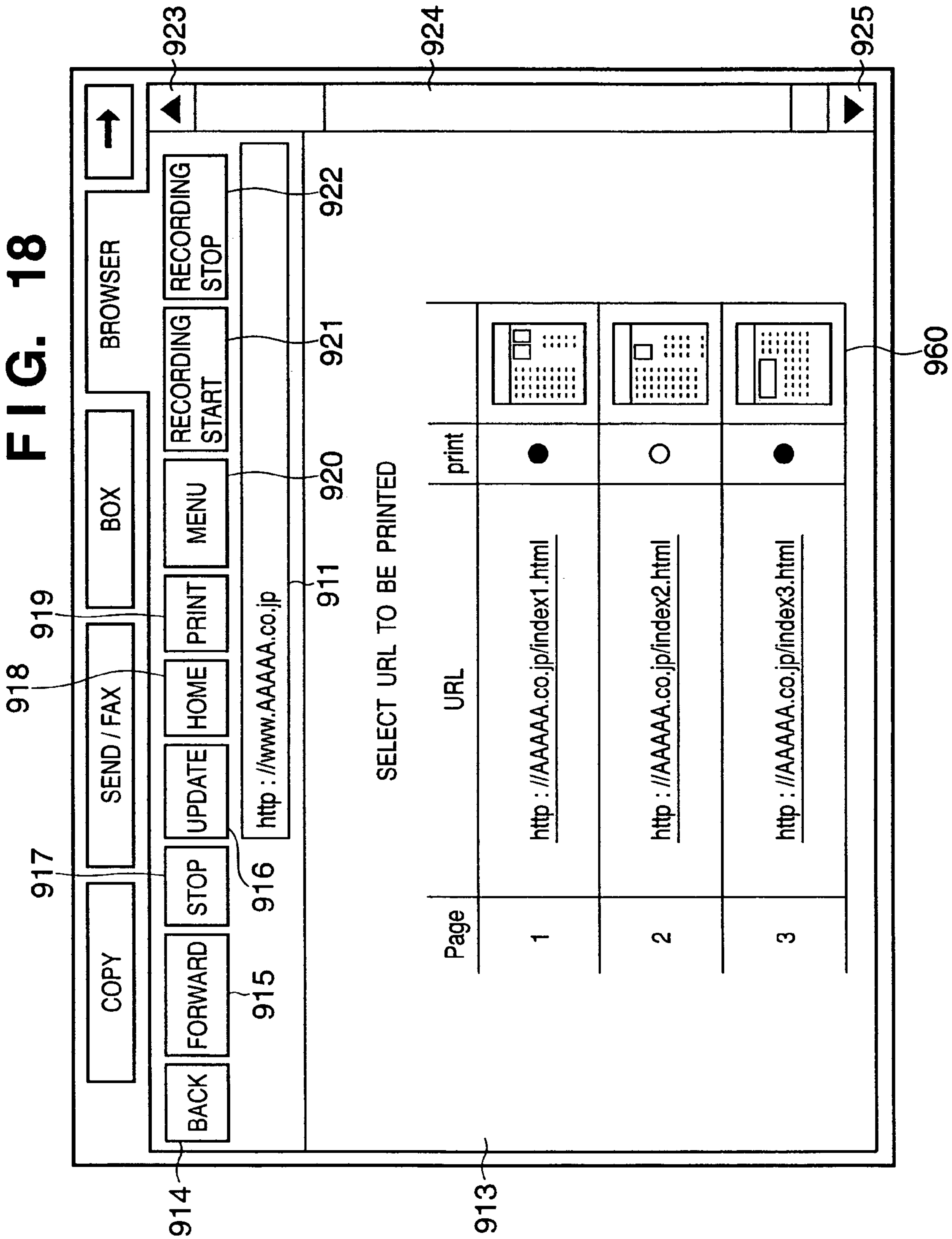
FIG. 18 is a view showing an operation window in still another mode.

Also, upon displaying the URL list on an operation window, as shown in FIG. 18, a method of displaying thumbnails of Web pages, as indicated by 960, may be used. In this case, upon displaying the URL list, Web pages to be displayed in the URL list are accessed, and their thumbnails are generated. In this manner, whether or not Web pages are to be printed can be easily determined based on the thumbnails in place of URL indications alone shown in FIG. 17.

Second Embodiment

The first embodiment has explained an example in which Web pages browsed from depression of the "recording start" button until depression of the "recording stop" button are recorded in the URL list. The second embodiment will explain an example in which Web pages to be recorded in the URL list are designated and recorded.

Figure 19:
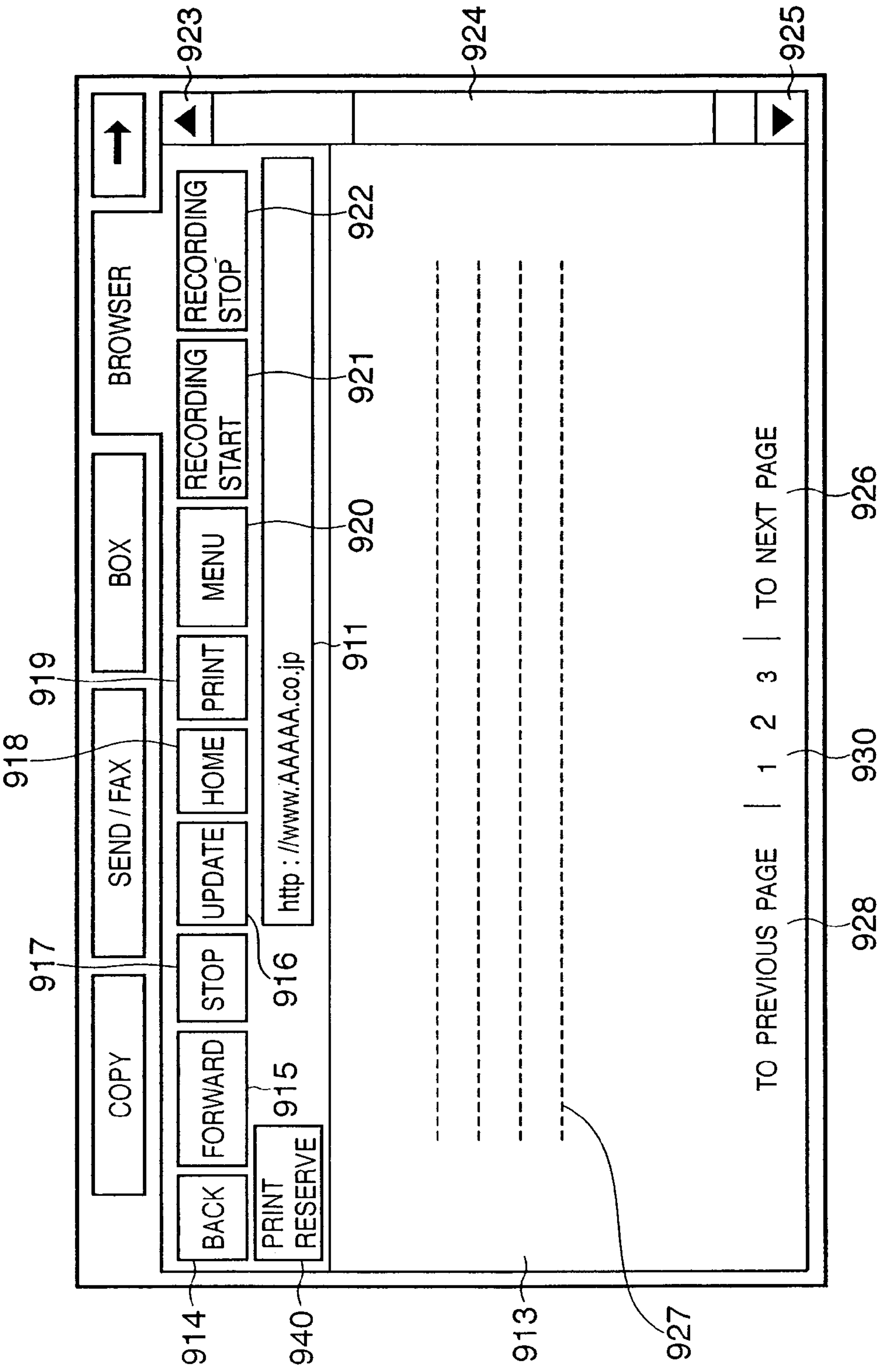
FIG. 19 is a view showing a browser startup window used in the second embodiment.

FIG. 19 shows an operation window according to the second embodiment, which is substantially the same as that shown in FIG. 6, except that a "print reserve" button 940 is added.

The print reserve button 940 is used to reserve a print operation of the currently browsed Web page. Upon depression of the print reserve button 940, the URL of that Web page is recorded in the URL list. This recording processing will be described below using the flowchart shown in FIG. 20.

Figure 20:
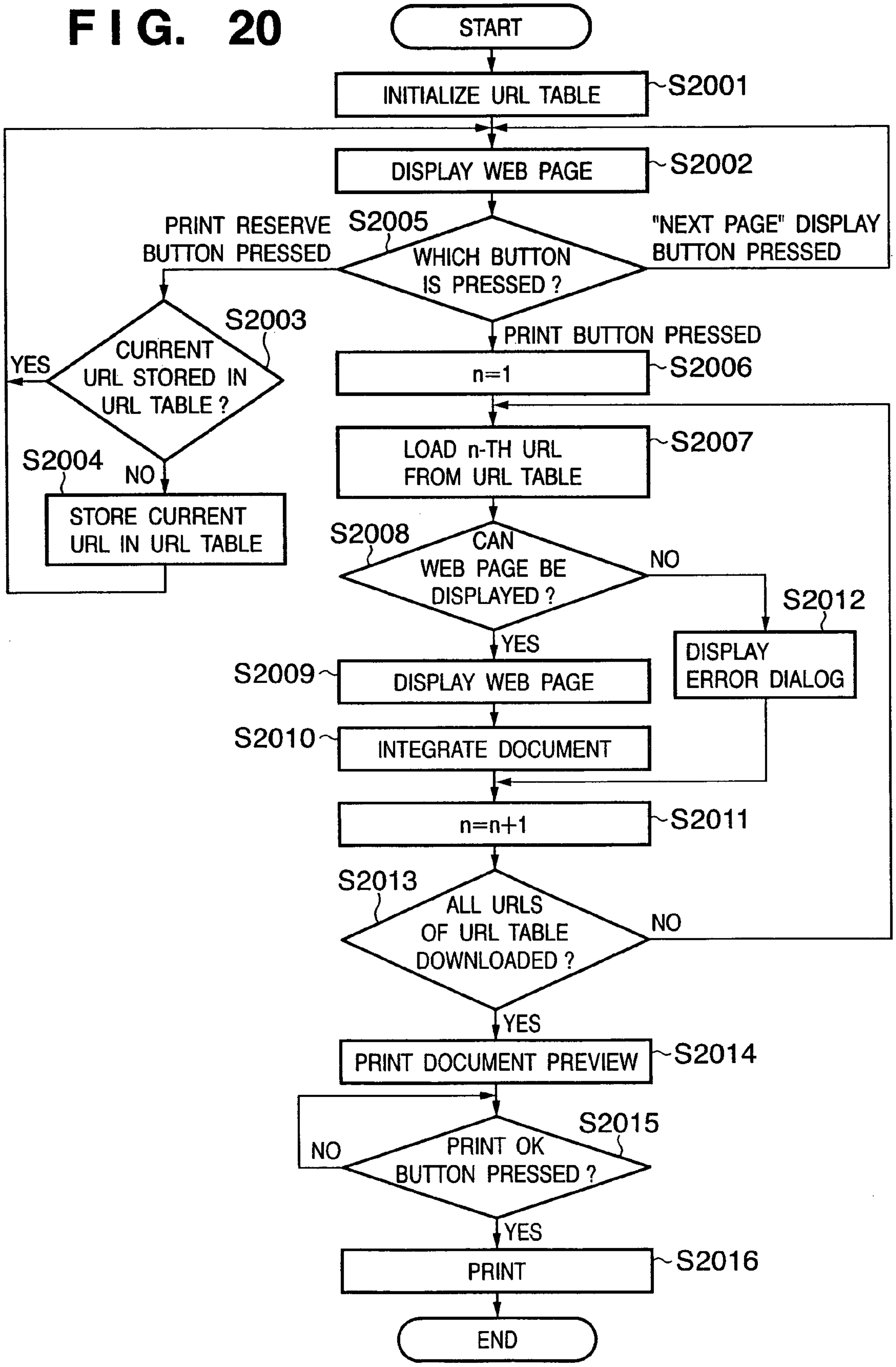
FIG. 20 is a flowchart for explaining the print operation of a Web page according to the second embodiment.

FIG. 20 is a flowchart for explaining the print operation of a Web page according to the second embodiment.

In step S2001, the URL table is initialized. This process is done when a reset button or the like is pressed. In step S2002, a Web page is displayed. Which button is pressed is checked in step S2005. If the pressed button is the print reserve button 940, it is confirmed in step S2003 in turn whether or not the current URL is stored in the URL table. If no current URL is stored in the URL table, the URL of the currently browsed Web page is saved in the URL table in step S2004.

After that, the current Web page is displayed again in step S2002. If it is confirmed in step S2003 that the current URL is stored in the URL table, the Web page is displayed in step S2002. If the button used to display another Web page is pressed in step S2005, a new Web page is displayed in step S2002. If the print button 919 is pressed in step S2005, a number reference value (n) in the URL table is reset to n=1 in step S2006. In step S2007, the n-th URL in the URL table is loaded. Since n=1 at this time, the first URL in the URL table is loaded. In this case, since http://AAAAA.co.jp/index2.html in FIG. 7 corresponds to the first page, this URL is loaded. It is checked in step S2008 whether or not a Web page can be displayed. If Web page data cannot be downloaded from the URL destination and causes an error display, a dialog indicating an error is displayed in step S2012. Furthermore, in step S2011, a reference counter of the URL table is incremented by +1 (n=n+1). By contrast, if it is confirmed in step S2008 that the Web page can be browsed, that Web page is displayed in step S2009, and Web pages are integrated in step S2010.

As the integration method, as described above, all Web pages. in the URL table are converted into PDL data, which are integrated as if they were a single and long document. Then, page separators are inserted in correspondence with the output paper size when the integrated document is output.

If it is confirmed in step S2013 that the Web pages are downloaded from all the URLs in the URL table, a preview of the print document is displayed in step S2014. The preview window is as shown in FIG. 9, and the user determines based on the preview if he or she wants to print it. If print processing is determined to be executed in step S2015, page separators are inserted. In step S2016, the already generated PDL data is rasterized by the RIP 2060 and raster image data is printed out.

In this way, since the URLs of only print-reserved Web pages of those which are browsed are recorded in the URL list, the print-reserved Web pages can be output by a single print command upon depression of the print button.

In the second embodiment as well, a print layout may be designated, and Web pages may be loaded from the URL list and may be imposed in the designated layout upon printing, as has been described in the first embodiment.

In the second embodiment as well, the user may select ● (print)/○ (not print) using a toggle switch alternately indicating ON/OFF every time he or she touches the URL list, as described in the first embodiment. In this case, Web pages may be displayed as thumbnail images to facilitate user's print decision.

Third Embodiment

As the recording means of the browsed URLs in the URL table shown in FIG. 7, in addition to recording of URLs by providing the recording start and recording end buttons of URLs as described in the first embodiment, in this embodiment, a case where Hypertext data in a Web page is searched using a keyword, and if the keyword hits given Hypertext, a link destination described in the Hypertext data is displayed, and the URL at that time is stored into the table will be explained.

Figure 21:
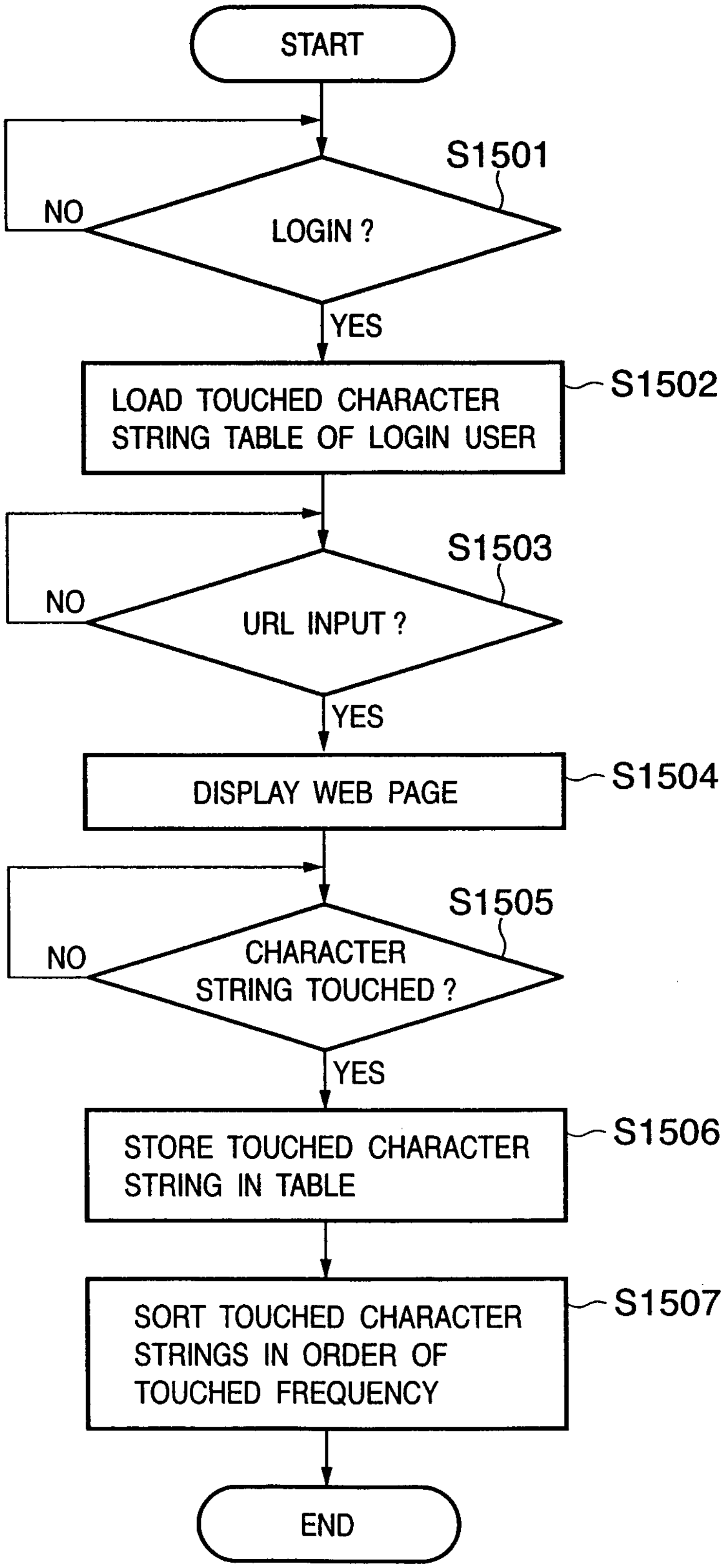
FIG. 21 is a flowchart of processing for registering a touched Hypertext character string.

FIG. 21 is a flowchart showing processing for registering a touched Hypertext character string. In step S1501, the user inputs a user ID and password to log into the system. In step S1502, a character string table of the login user is loaded. In step S1503, a URL is input. In step S1504, a Web page is displayed. It is checked in step S1505 whether or not a Hypertext character string is touched. If the Hypertext character string is touched, the Hypertext character string designated by touching is stored in the character string table in step S1506. The registered Hypertext character string is stored in a character string table shown in FIG. 22.

The character string table will be described below. Referring to FIG. 22, "UserID" indicates the login user name. A table is assured for each user. Touched keywords are stored in a keyword column, and an order column indicates a list of touched keywords which are sorted in descending order of frequency of their occurrence.

Figure 23:
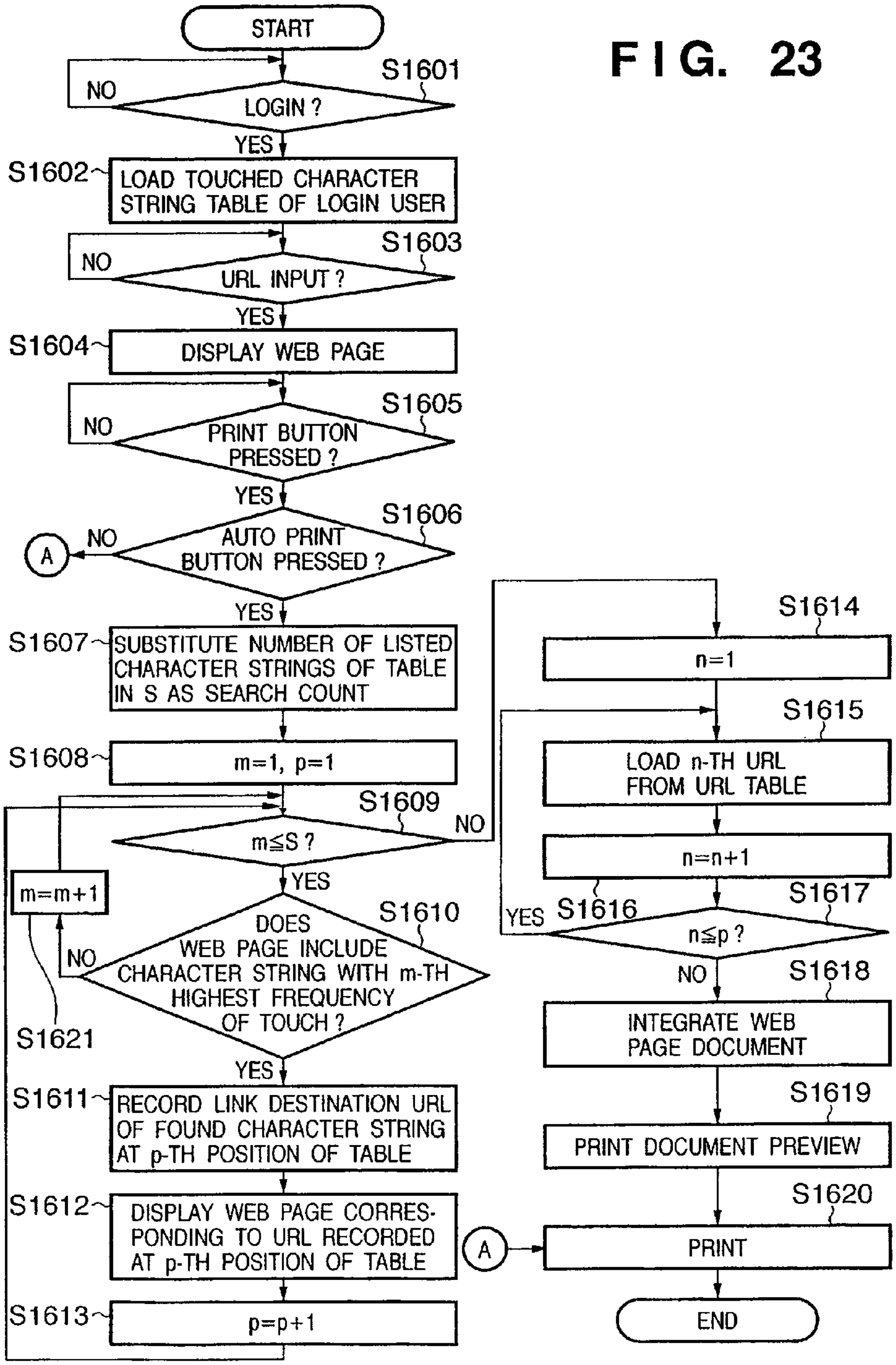
FIG. 23 is a flowchart for explaining print processing of a Web page according to the third embodiment.

Processing for searching the character string table for character strings in the order of touched frequency, transferring URLs to the URL table, and printing corresponding Web pages will be described below using FIG. 23. That is, in the third embodiment, when the user accesses a given Web site and prints its page, it is confirmed whether or not a Web page to be printed includes character strings registered in the character string table. If the registered character strings are found, pages related to them are also acquired and printed. In this manner, a load on the user's operation is reduced. For example, as shown in FIG. 22, if an HTML character string "next" with a higher frequency of touching is found, pages related to that character string are printed all at once.

In step S1601, the user inputs a user name and password to login the system. In step S1602, a character string table of that login user is loaded. It is confirmed in step S1603 whether or not a URL is input. If the URL is input, a Web page is displayed in step S1604.

It is checked in step S1605 whether or not the print button 919 is pressed. If the print button is pressed, the flow advances to step S1606. It is checked in step S1606 whether or not an auto print button is pressed. If the auto print button is not pressed, the flow jumps to step S1620 to print the currently browsed Web page, thus ending the processing.

By contrast, if the auto print button is pressed in step S1606, the flow advances to step S1607 to set the number of table data of the character string table in a variable S. Since there are five table data in case of FIG. 22, S=5. In step S1608, the value of a reference pointer is reset to m=1. In step S1609, the reference pointer m indicating the reference position of the character string table is compared with the number (S) of table data in the character string table. In the example shown in FIG. 22, since five touched character strings are listed, S=5. It is checked in step S1609 whether or not $m \leqq S$. This step checks if the character string to be referred to in the table reaches the last reference position. If m≦S, the m-th character string in the character string table is referred to in step S1610. In case of m=1, the Web page is searched for a Hypertext character string "next". If no character string is found, m=m+1 in step S1621. That is, m=2, and the Web page is similarly searched for a Hypertext character string "next page".

The search method will be described below using FIG. 24. In FIG. 24, reference numeral 1804 denotes a Web page. Reference numeral 1803 denotes information described in the Web page. The Web page includes text, photo data, graphics data, and the like. Reference numeral 1801 denotes a Hypertext character string which instructs to move to the previous page of the current Web page; and 1802, a Hypertext character string which similarly instructs to move to the next page of the current Web page. By touching the Hypertext part, a linked Web page is opened. For example, "previous page" 1801 displays previous.html, as indicated by 18-*a*, and "next page" 1802 displays next.html, as indicated by 18-*b*, when they are touched.

In step S1611, the link destination URL of the found character string is recorded in the p-th position of the URL table. In step S1612, a Web page corresponding to that URL is displayed. In step S1613, p=p+1, and a link destination URL of the character string with the next higher frequency of touching occurrence is acquired.

Upon completion of the search processing of all the character strings and acquisition of the link destination Web page URLs in step S1609, the flow advances to step S1614.

In steps S1614 to S1617, Web page data registered in the URL table are acquired.

The acquired Web pages are integrated by the method described in the first embodiment in step S1618, and a preview of the print document generated by integrating the Web pages is displayed in step S1619.

In step S1620, print processing is finally executed.

In the third embodiment as well, a print layout may be designated, and Web pages may be loaded from the URL list and may be imposed in the designated layout upon printing, as has been described in the first embodiment.

In the third embodiment as well, the user may select ● (print)/○ (not print) using a toggle switch alternately indicating ON/OFF every time he or she touches the URL list, as described in the first embodiment. In this case, Web pages may be displayed as thumbnail images to facilitate user's print decision.

Effect of Embodiments

According to each of the above embodiments, the user can print an HTML document including a plurality of pages by issuing only one print instruction without turning pages. In other words, there is no need for performing a series of operations for browsing the HTML document and issuing a print instruction for each page. The browsed HTML document can be converted into PDL data, and page separators can be inserted in correspondence with the output paper size. Hence, information of Web pages can be packed, resulting in paper savings.

According to each of the above embodiments, Web pages can be printed at the same time using the URL list in place of repetition of Web page browsing and Print button depression unlike in the conventional Web page print processing. This allows the user to freely determine a layout on one print page. That is, this means that, for example, four pages can be laid out on two faces of one sheet of print paper like in the 4in1, two-sided print mode. In this way, output paper sheets can be saved.

In the aforementioned embodiments, a multi-function image forming apparatus such as a copying machine having a data transmission/reception function has been exemplified. The Web page print processing implemented by this apparatus can also be implemented by a print system including a personal computer and printer. For example, in an environment in which a Web browser and printer driver are installed in that personal computer, the printer driver may have a document integration function of Web pages. In this manner, the same functions as those described in the above embodiments can be implemented, and the same effects can be achieved.

In the aforementioned embodiments, the document integration processing is executed after HTML data of the browsed pages are converted into PDL data. However, the present invention is not limited to such specific processing. For example, the document integration processing may be done using HTML data, and the integrated HTML data may then be converted into PDL data.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-268709 filed on Sep. 15, 2004, which is hereby incorporated by reference herein.

What is claimed is:

1. An image forming apparatus capable of accessing a network and displaying a Web page, comprising:

a Web page acquisition unit configured to acquire Web page data located by a URL (Uniform Resource Locator);

a display unit configured to display a Web page, based on the Web page data acquired by the Web page acquisition unit;

an operation unit configured to accept a user operation for the image forming apparatus;

a recording unit configured to record a history of which Web pages are displayed by the display unit, wherein the user issues a recording instruction to begin the recording of the visited pages and the pages are recorded until the user issues an instruction to discontinue the recording of the visiting pages;

a converting unit configured to convert the Web page data to print data;

a printing unit configured to execute print processing on the basis of the print data;

a page integration unit configured to integrate a plurality of print data, and generate the integrated print data; and a control unit configured to:

in a case where the operation unit accepts, from a user, an instruction for printing the Web page currently displayed by the display unit, control the converting unit such that it converts a Web page data of the Web page currently displayed by the display unit to print data, and further control the printing unit to print the print data; and in a case where the operation unit accepts, from a user, an instruction for printing a plurality of Web pages which were previously displayed by the display unit and whose history was recorded by the recording unit, control the converting unit such that it converts a plurality of Web page data of the plurality of Web pages previously displayed by the display unit to a plurality of print data, based on the history recorded by the recording unit, control the page integration unit such that it integrates the plurality of print data converted by the converting unit without further user intervention and generate the integrated data, and further control the printing unit to print the integrated print data, wherein the instruction for printing a plurality of Web pages is generated without any user's operation for selecting each of the plurality of Web pages.

2. The apparatus according to claim 1, wherein the recording unit records the URL information in a URL table in accordance with a URL recording start instruction and a URL recording stop instruction.

3. The apparatus according to claim 1, wherein the conversion unit converts a plurality of Web page data acquired by the Web page acquisition unit into a plurality of page description language data, and the page integration unit integrates the plurality of page description language data and generates the integrated page description language data.

4. A Web page print control method using an apparatus capable of accessing a network, displaying a Web page and printing the Web page, comprising:

a Web page acquisition step of acquiring Web page data located by a URL (Uniform Resource Locator);

a display step of displaying a Web page, based on the Web page data acquired in a display unit at the Web page acquisition step;

a recording step of recording a history of which Web pages are displayed in the display unit, wherein the user issues a recording instruction to begin the recording of the visited pages and the pages are recorded until the user issues an instruction to discontinue the recording of the visiting pages; and a control step of:

in a case where an instruction for printing the Web page currently displayed in the display unit from an user is accepted in an operation unit of the apparatus, controlling to convert a Web page data of the Web page currently displayed in the display unit to print data, and further controlling to print the print data; and in a case where an instruction for printing a plurality of Web pages which were previously displayed in the display unit and whose history was recorded at the recording step from a user is accepted in the operation unit, controlling to convert a plurality of Web page data of the plurality of Web pages previously displayed in the display unit to a plurality of print data, based on the history recorded at the recording step, integrate the plurality of converted print data without further user intervention and generate the integrated data, and further controlling to print the integrated print data, wherein the instruction for printing a plurality of Web pages is generated without any user's operation for selecting each of the plurality of Web pages.

5. A non-transitory computer readable storage medium which stores a computer program which performs each step in a method according to claim 4.

* * * * *